(12) United States Patent
Kannaka et al.

(10) Patent No.: US 9,354,047 B2
(45) Date of Patent: May 31, 2016

(54) ROTATIONAL MISALIGNMENT MEASURING DEVICE OF BONDED SUBSTRATE, ROTATIONAL MISALIGNMENT MEASURING METHOD OF BONDED SUBSTRATE, AND METHOD OF MANUFACTURING BONDED SUBSTRATE

(71) Applicants: Kobe Steel, Ltd., Hyogo (JP); KOBELCO RESEARCH INSTITUTE, INC., Hyogo (JP)

(72) Inventors: Masato Kannaka, Kobe (JP); Masakazu Kajita, Kobe (JP); Eiji Takahashi, Kobe (JP); Yuji Yamamoto, Kobe (JP); Masaru Akamatsu, Kobe (JP); Kunio Iba, Kobe (JP); Kenji Imanishi, Kobe (JP)

(73) Assignees: KOBE STEEL, LTD., Hyogo (JP); KOBELCO RESEARCH INSTITUTE, INC., Hyogo (JP)

( * ) Notice: Subject to any disclaimer, the term of this patent is extended or adjusted under 35 U.S.C. 154(b) by 108 days.

(21) Appl. No.: 13/691,491

(22) Filed: Nov. 30, 2012

(65) Prior Publication Data
US 2013/0139950 A1 Jun. 6, 2013

(30) Foreign Application Priority Data

Dec. 2, 2011 (JP) ................................. 2011-264281
Aug. 17, 2012 (JP) ................................. 2012-180747

(51) Int. Cl.
*B32B 41/00* (2006.01)
*G01B 11/27* (2006.01)

(52) U.S. Cl.
CPC .................................... *G01B 11/272* (2013.01)

(58) Field of Classification Search
CPC ............ H01L 2223/54426; H01L 2223/54493
USPC ............... 156/64, 350, 368, 378, 379; 33/1 N
See application file for complete search history.

(56) References Cited

U.S. PATENT DOCUMENTS 5,555,091 A 9/1996 Kagamida
6,979,629 B2 * 12/2005 Yanagita et al. .............. 438/458
7,477,372 B2 * 1/2009 Leslie et al. ............... 356/237.2

(Continued)

FOREIGN PATENT DOCUMENTS

JP 1-098908 A 4/1989
JP 7-218228 A 8/1995

(Continued)

OTHER PUBLICATIONS

An Office Action; "Notice of Reasons for Rejection," issued by the Japanese Patent Office on Apr. 28, 2015, which corresponds to Japanese Patent Application No. 2012-180747 and is related to U.S. Appl. No. 13/691,491; which English language summary.

*Primary Examiner* — Alison L Hindenlang
*Assistant Examiner* — Joshel Rivera
(74) *Attorney, Agent, or Firm* — Studebaker & Brackett PC

(57) ABSTRACT

A rotational misalignment between semiconductor wafers constituting a bonded wafer is calculated. A light source is arranged at a position which is on a front side of an opening of a notch and which is separated from an outer edge portion of a bonded wafer by a predetermined interval, and outputs light to irradiate the outer edge portion of the bonded wafer including the notch. A camera receives and photoelectrically converts reflected light that is specularly-reflected by the outer edge portion of the bonded wafer including the notch among the light outputted by the light source in order to output a brightness distribution of the reflected light as an image. A computer analyzes positions of notches from the image outputted by the camera to obtain a notch position misalignment, and further calculates a rotational misalignment between semiconductor wafers using a center position misalignment between the semiconductor wafers.

6 Claims, 19 Drawing Sheets

(56) References Cited

U.S. PATENT DOCUMENTS

| | | |
|---|---|---|
| 7,861,421 B2 | 1/2011 | Kobayashi et al. |
| 2002/0025652 A1 | 2/2002 | Yanagita et al. |
| 2003/0169916 A1* | 9/2003 | Hayashi et al. ............... 382/145 |
| 2004/0067621 A1 | 4/2004 | Yanagita et al. |
| 2010/0132205 A1 | 6/2010 | Kobayashi et al. |

FOREIGN PATENT DOCUMENTS

| | | |
|---|---|---|
| JP | 2009-032802 A | 2/2009 |
| JP | 2011-021916 A | 2/2011 |
| JP | 2011-066283 A | 3/2011 |
| KR | 2002-0011119 A | 2/2002 |

* cited by examiner

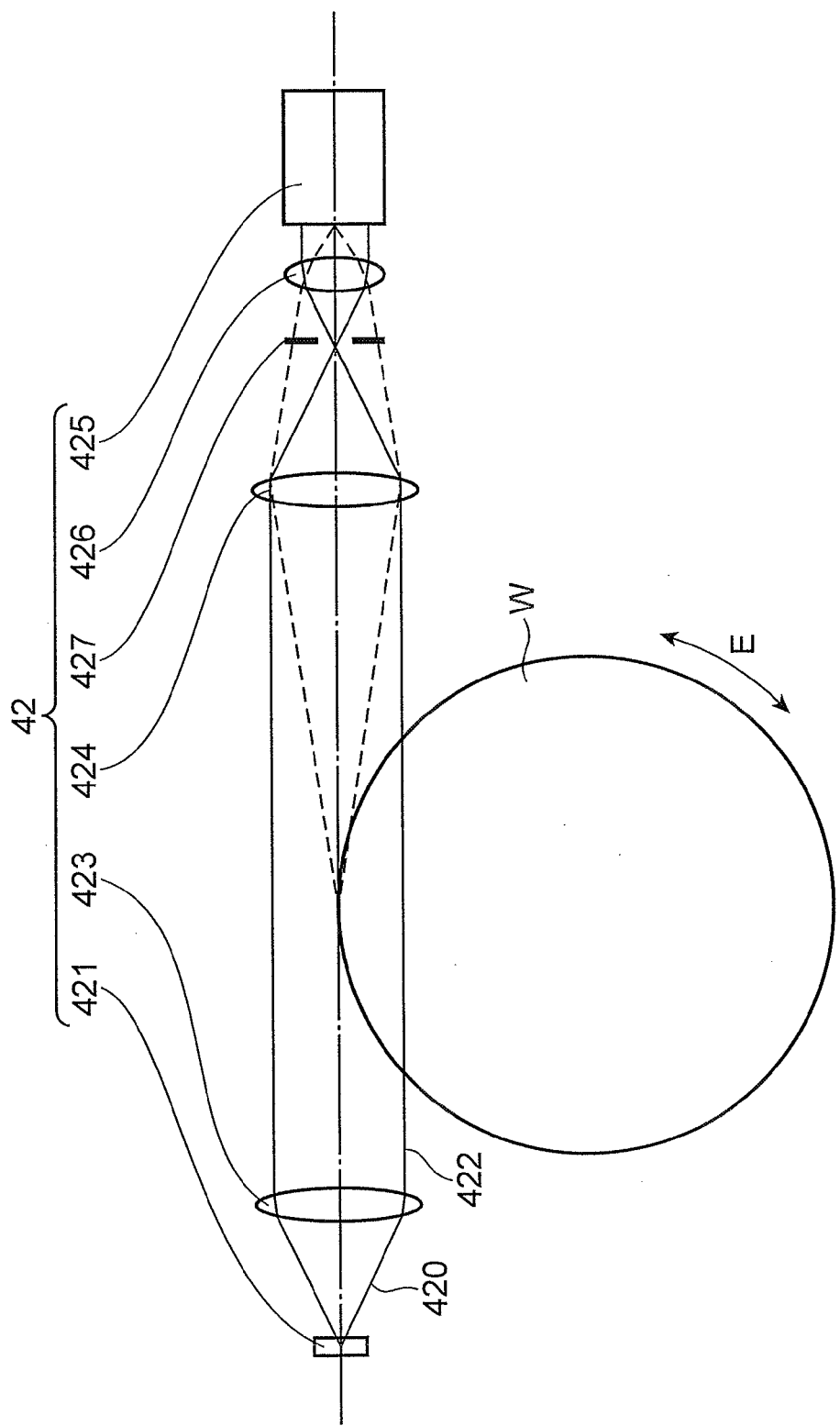

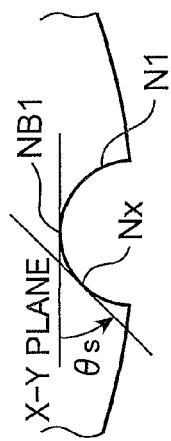
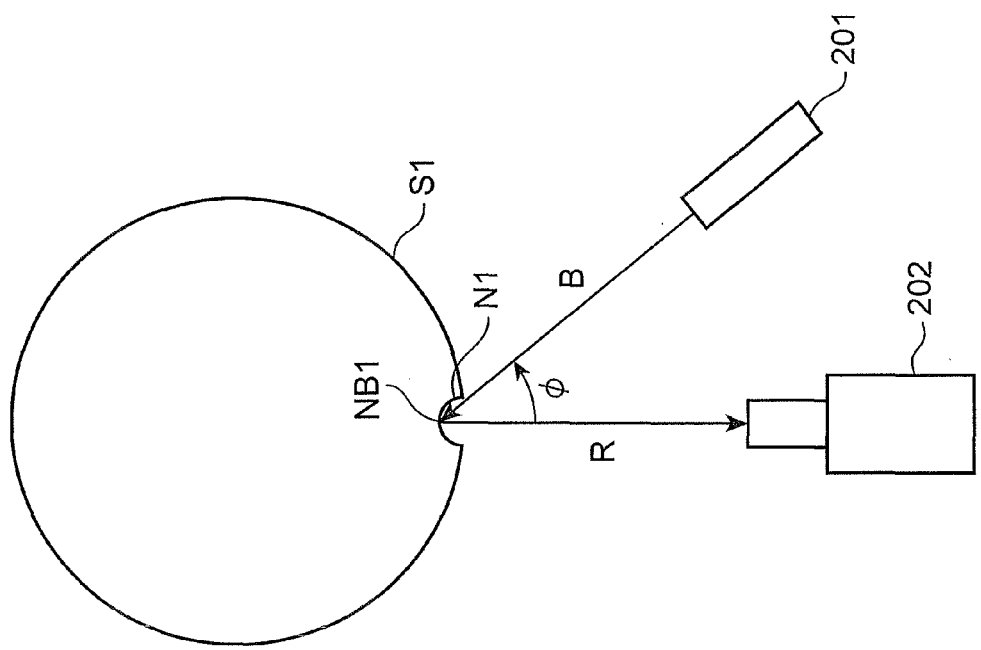

FIG.13
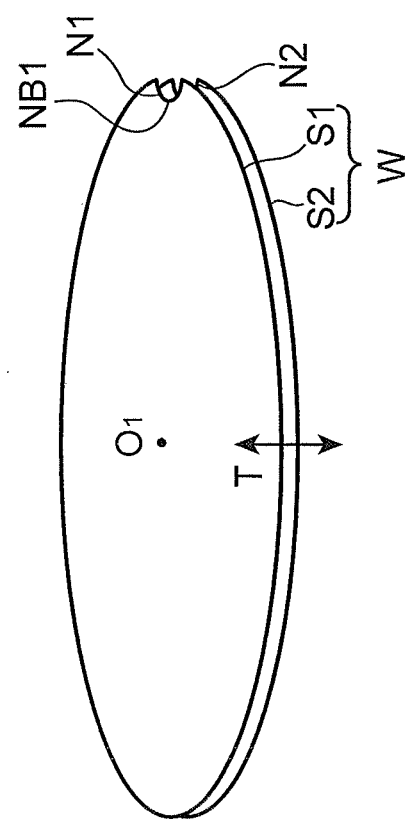
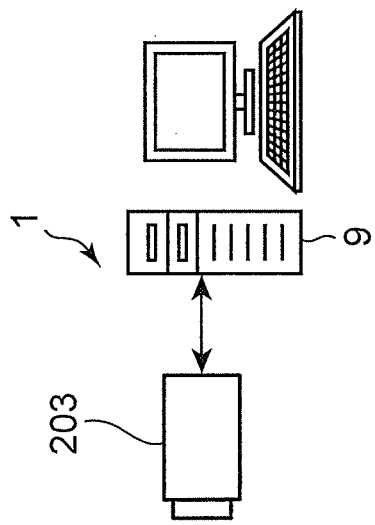

FIG.15A
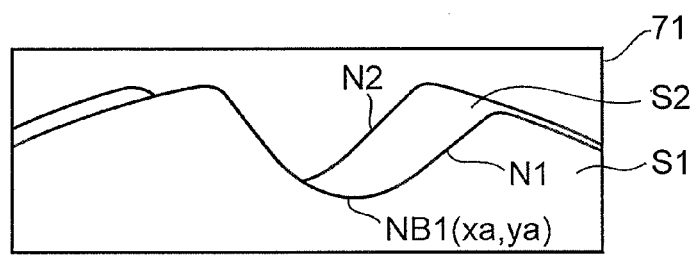
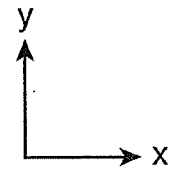
FIG.15B
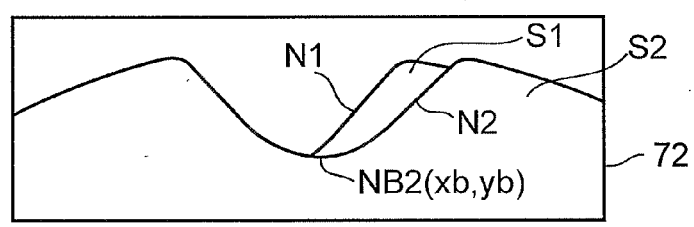

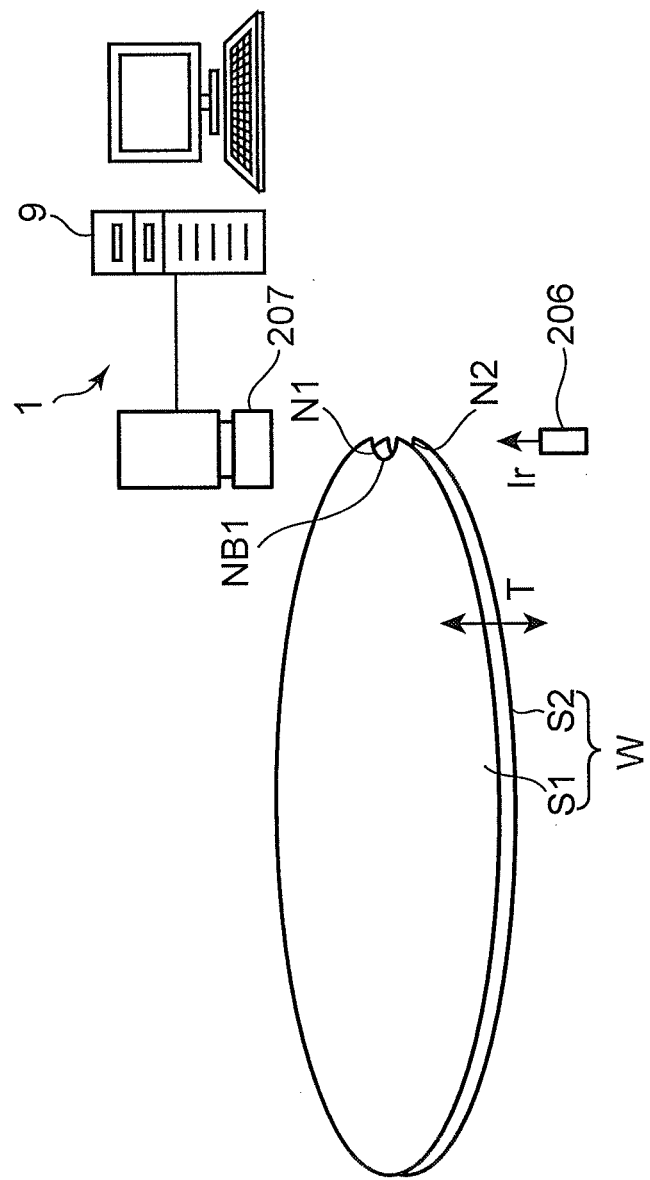

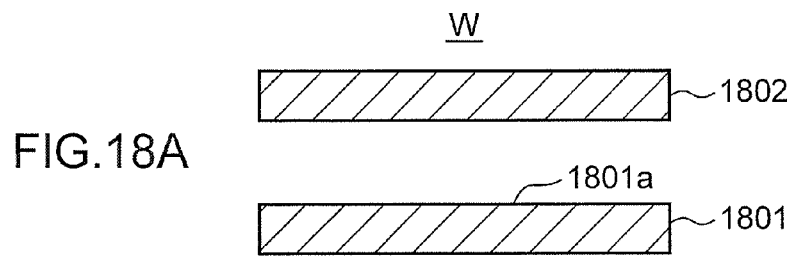
FIG.18A
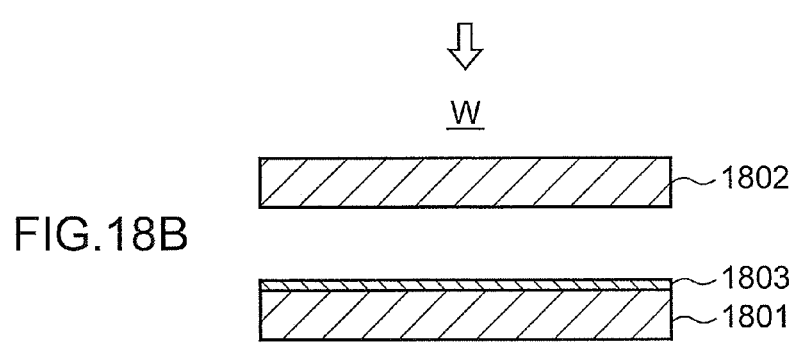
FIG.18B
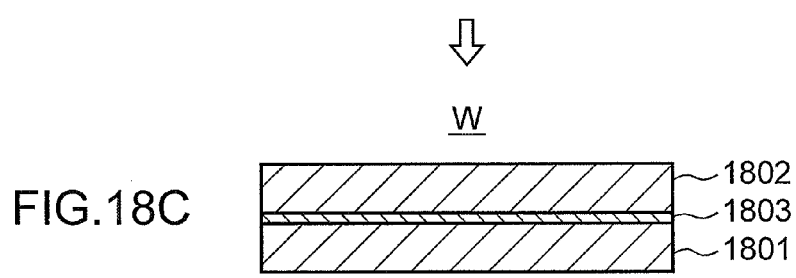
FIG.18C
FIG.19
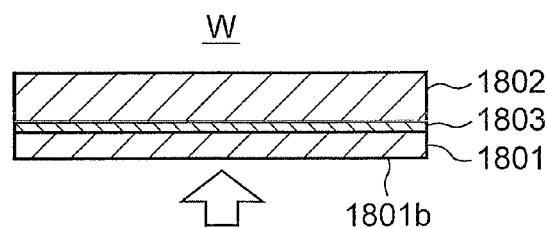

ROTATIONAL MISALIGNMENT MEASURING DEVICE OF BONDED SUBSTRATE, ROTATIONAL MISALIGNMENT MEASURING METHOD OF BONDED SUBSTRATE, AND METHOD OF MANUFACTURING BONDED SUBSTRATE

BACKGROUND OF THE INVENTION

1. Field of the Invention

The present invention relates to a technique for detecting a rotational misalignment between respective substrates of a bonded substrate in which a plurality of disk-like substrates such as semiconductor wafers each having a notch formed in an outer edge portion thereof is stacked on top of each other and bonded together.

2. Description of the Related Art

With the increases in speed and capacity of semiconductor chips, recently, a technique is known for bonding together a plurality of semiconductor wafers and providing wiring between top and bottom wafers with a through silicon via (TSV). Bonding semiconductor wafers together in this manner requires a technique for accurately bonding the semiconductor wafers to each other in a bonding process. In other words, the semiconductor wafers must be accurately positioned. In order to do so, diameters and center positions of the semiconductor wafers must be accurately measured and positioning of the semiconductor wafers must be performed using the measurements.

Japanese Patent Application Laid-open No. H07-218228 describes a method of measuring a diameter of a single semiconductor wafer and Japanese Patent Application Laid-open No. H01-098908 describes a method of detecting a rotational misalignment of a single semiconductor wafer. Japanese Patent Application Laid-open No. 2009-032802 describes a method of measuring a rotation angle of each of a plurality of semiconductor wafers that has been bonded together by observing a contour of each semiconductor wafer and calculating a notch direction.

However, since the method described in Japanese Patent Application Laid-open No. H07-218228 is a method of obtaining a diameter using a measured distance value from a center of a semiconductor wafer to an orientation flat, a measurement with high accuracy cannot be expected. The method described in Japanese Patent Application Laid-open No. H01-098908 requires that a grating-like pattern be created in advance on a semiconductor wafer. In addition, the method described in Japanese Patent Application Laid-open No. 2009-032802 is used for measurement after a bonded wafer has been thinned and cannot be used for measurement at the time of bonding.

Furthermore, when a notch indicating a crystal orientation is formed on an outer edge portion of a semiconductor wafer, bonding is performed by conforming notch positions to each other. However, when a minute positional misalignment occurs during a bonding process, there were no conventional means to detect such a positional misalignment at a micron level.

SUMMARY OF THE INVENTION

An object of the present invention is provide a technique that enables a rotational misalignment between respective substrates of a bonded substrate in which substrates such as a semiconductor wafer are bonded together to be measured with high accuracy.

A rotational misalignment measuring device according to an aspect of the present invention is a rotational misalignment measuring device of a bonded substrate which detects a rotational misalignment between respective substrates of a bonded substrate in which a plurality of disk-like substrates each having a notch formed in an outer edge portion thereof is stacked on top of each other and bonded together in a thickness direction of the substrates, the rotational misalignment measuring device including: center position misalignment acquiring means for acquiring a center position misalignment that is a misalignment of a center position of each substrate; notch shape acquiring means for acquiring shape information of a notch of each substrate; notch position misalignment calculating means for obtaining a notch position of each substrate from the notch shape information and calculating, from the notch position, a notch position misalignment that is a misalignment of notch positions between the respective substrates; and rotational misalignment calculating means for calculating a rotational misalignment between the respective substrates based on the center position misalignment and the notch position misalignment.

BRIEF DESCRIPTION OF THE DRAWINGS

FIG. 6 is a diagram for explaining a measurement principle of a shape of an outer edge portion of a bonded wafer by an edge shape measuring unit;

FIGS. 10A and 10B are diagrams for explaining reference numerals indicating a light irradiating direction and the like;

FIG. 13 is a diagram showing a configuration of a rotational misalignment measuring device in a case where shape information of a notch is acquired using a laser microscope;

FIGS. 15A and 15B are diagrams showing examples of an image photographed by a camera group;

FIG. 16 is a diagram showing a configuration of a rotational misalignment measuring device in a case where shape information of a notch is acquired using an infrared camera;

FIGS. 18A, 18B and 18C are diagrams showing a bonded wafer manufacturing process according to an embodiment of the present invention;

FIG. 19 is a diagram which shows a bonded wafer manufacturing process according to an embodiment of the present invention and which is a continuation of FIG. 18A, 18B, 18C.

DESCRIPTION OF THE PREFERRED EMBODIMENTS

Hereinafter, an embodiment of the present invention will be described in detail with reference to the drawings. Moreover, in the following embodiment, a substrate according to the present invention will be described as a semiconductor wafer and a bonded substrate according to the present invention will be described as a bonded wafer in which a plurality of semiconductor wafers is bonded to each other. However, it is to be understood that these are merely examples, and since a substrate according to the present invention refers to a disk-like plate constituted by a material such as a semiconductor, glass, and sapphire which is mainly used in an electronic circuit board, a substrate according to the present invention is not limited to a semiconductor wafer.

First, a center position misalignment, a notch position misalignment, and a rotational misalignment between semiconductor wafers constituting a bonded wafer according to the present embodiment will be described. Moreover, while a bonded wafer made up of two semiconductor wafers will be described by way of example in the embodiment, below, the number of bonded semiconductor wafers is not limited thereto.

Figure 1:
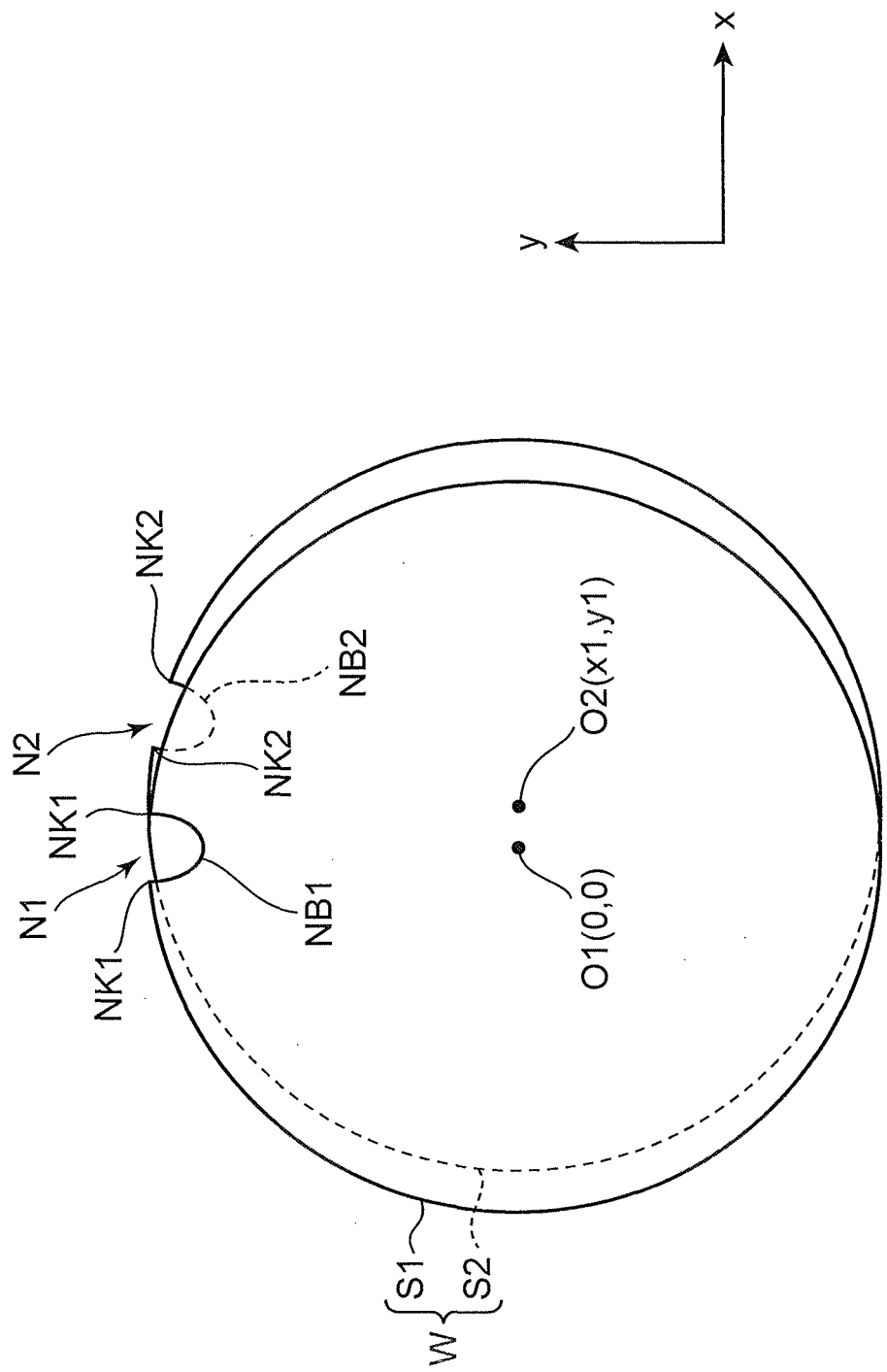
FIG. 1 is a diagram for explaining reference numerals denoting respective portions of a bonded wafer.

FIG. 1 is a diagram for explaining reference numerals denoting respective portions of a bonded wafer W. Semiconductor wafers S1 and S2 (hereinafter, collectively referred to as a "semiconductor wafer S" whenever appropriate) are bonded to each other to form the bonded wafer W. The semiconductor wafer S1 is on a near side on the plane of paper and the semiconductor wafer S2 is on a far side on the plane of paper. A contour of the semiconductor wafer S2 which is hidden behind the semiconductor wafer S1 is depicted by a dotted line. A point O1 represents a center of the semiconductor wafer S1 and a point O2 represents a center of the semiconductor wafer S2.

In addition, a notch N1 is formed in an outer edge portion of the semiconductor wafer S1 and a notch N2 is formed in an outer edge portion of the semiconductor wafer S2. The notches N1 and N2 (hereinafter, collectively referred to as a "notch N" whenever appropriate) are approximately semicircular (recessed shape) notched portions that are formed in order to indicate crystal orientations of the semiconductor wafers S1 and S2.

Furthermore, reference numeral NK1 denotes a shoulder portion of the notch N1 and NK2 denotes a shoulder portion of the notch N2. A notch shoulder portion refers to a vicinity of a boundary between a circumferential portion of the semiconductor wafer S and the notch N. In addition, reference numeral NB1 denotes a bottom portion of the notch N1 and NB2 denotes a bottom portion of the notch N2. A notch bottom portion refers to a portion among the outer edge portion the notch N that is closest to a center position of the semiconductor wafer S. Moreover, hereinafter, the notch shoulder portions NK1 and NK2 will be collectively referred to as a "notch shoulder portion NK" and the notch bottom portions NB1 and NB2 will be collectively referred to as a "notch bottom portion NB" whenever appropriate.

When bonding the semiconductor wafers S1 and S2 to each other, respective bonding positions are adjusted by conforming centers and the notches N1 and N2 of the semiconductor wafers S1 and S2 to each other. However, a slight misalignment of the centers and the notch positions of the semiconductor wafers S1 and S2 may occur during this process. FIG. 1 shows a state where the semiconductor wafers S1 and S2 overlap each other while centers and notches are displaced from each other. In the description of FIG. 1, it is assumed that a horizontal direction when facing the plane of paper represents x coordinates and a vertical direction when facing the plane of paper represents y coordinates.

In order to obtain a rotational misalignment, a rotational misalignment measuring device of a bonded wafer according to the present invention first (1) measures a center position misalignment between the center position O1 of the semiconductor wafer S1 and the center position O2 of the semiconductor wafer S2. When measuring the center position misalignment, a coordinate (x1, y1) of the center position O2 of the semiconductor wafer S2 is measured when it is assumed that the center position O1 of the semiconductor wafer S1 that is a reference wafer has a coordinate of (0, 0). As a result of the measurement, a distance between the center position O1 of the semiconductor wafer S1 and the center position O2 of the semiconductor wafer S2 can be obtained.

Next, (2) a positional misalignment between the notch N1 and the notch N2 is measured. When measuring the notch position misalignment, x2 (refer to FIG. 2) that is a distance in the x direction between the notch bottom portion NB1 and the notch bottom portion NB2 is measured.

Figure 2:
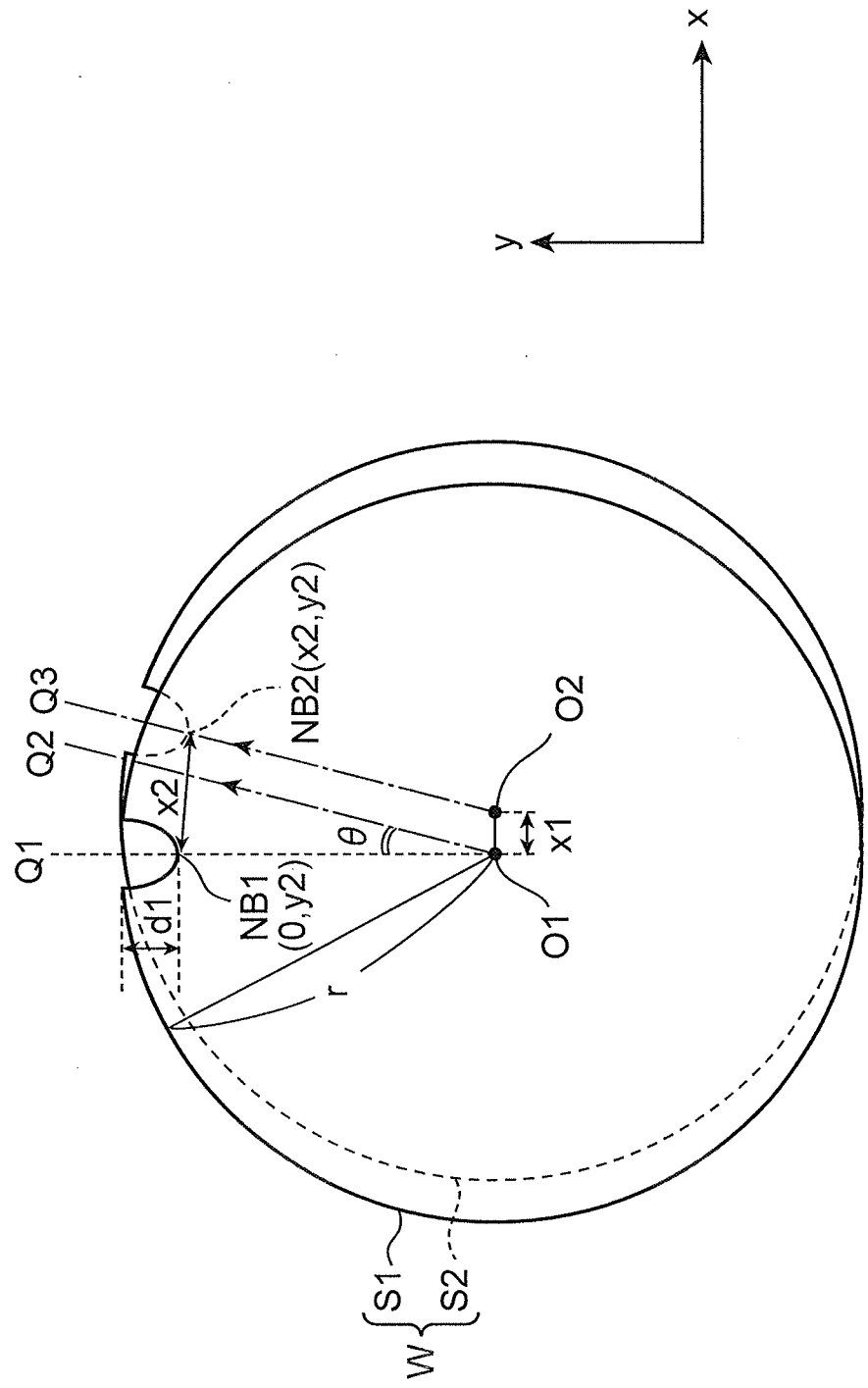
FIG. 2 is a diagram for explaining a rotational misalignment.

FIG. 2 is a diagram for explaining a rotational misalignment. Let us now assume that the notch bottom portion NB1 of the semiconductor wafer S1 that is the reference wafer has a coordinate of (0, y2) and the notch bottom portion NB2 of the semiconductor wafer S2 has a coordinate of (x2, y2).

Normally, the semiconductor wafers S1 and S2 are overlapped on each other using a precision instrument or the like so that the notch N1 and the notch N2 conform to each other, and even if notch positions are misaligned, the misalignment is at a micron level. Therefore, in the present embodiment, a misalignment between the notch bottom portion NB1 and the notch bottom portion NB2 in the y direction is ignored and only a misalignment in the x direction is measured. As such, in FIG. 2, the notch bottom portions NB1 and NB2 are both shown to have a y coordinate of y2. However, it is needless to say that a rotational misalignment between the semiconductor wafers S1 and S2 can also be obtained by taking the misalignment of the notch bottom portion NB2 in the y direction into consideration.

Subsequently, (3) a rotational misalignment of the semiconductor wafer S2 with respect to the semiconductor wafer S1 is calculated. If a center position misalignment in the x direction is denoted by x1, a notch position misalignment is denoted by x2, radii of the semiconductor wafers S1 and S2 are denoted by r, and depths of the notches N1 and N2 in a radial direction of the semiconductor wafers are denoted by d1, then a rotational misalignment θ is expressed by Equation (A).

$$\theta = \tan^{-1}\{(x2-x1)/(r-d1)\} \quad \text{(A)}$$

In other words, the rotational misalignment θ is an angle between a straight line Q1 that connects the center position O1 and the notch bottom portion NB1 and a straight line Q2 that connects the center position O2 and the notch bottom portion NB2 (or a straight line Q3 obtained by translating the straight line Q2 by the center position misalignment x1 in the x direction). Moreover, the Equation (A) is merely an example and the rotational misalignment θ may be obtained using a calculation formula other than the Equation (A).

Figure 3:
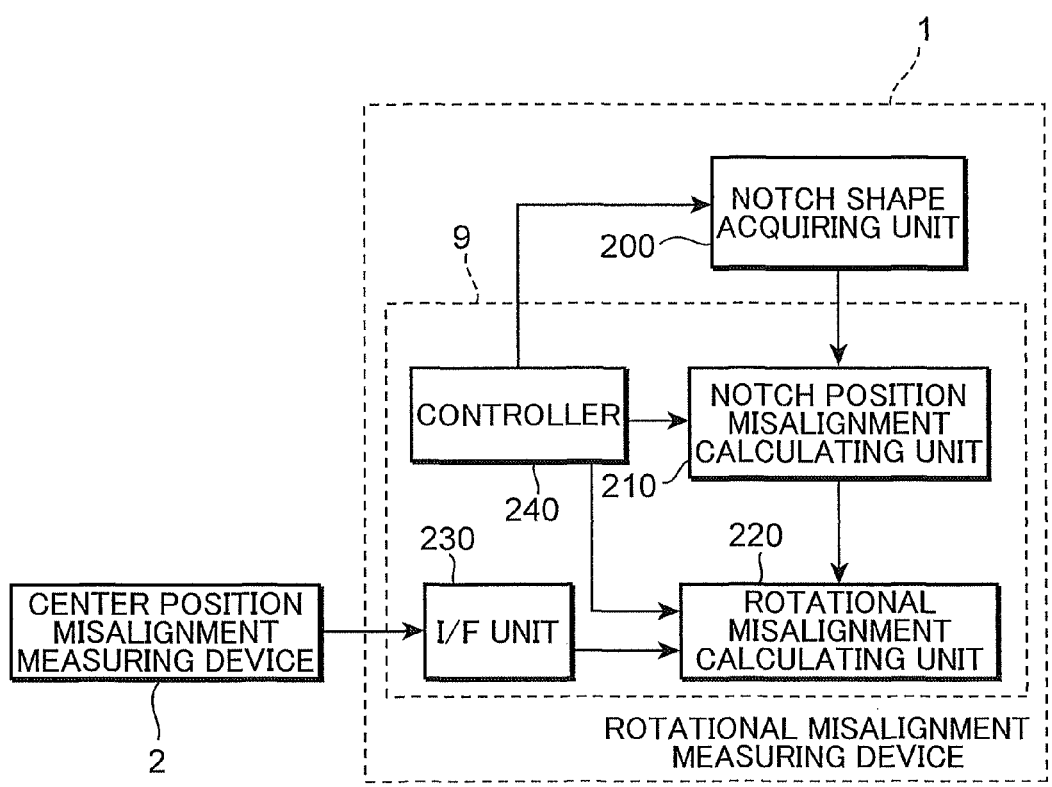
FIG. 3 is a block diagram showing an electrical configuration of a rotational misalignment measuring device of a bonded wafer.

FIG. 3 is a block diagram showing an electrical configuration of a rotational misalignment measuring device 1 of the bonded wafer W according to the present invention. The rotational misalignment measuring device 1 includes a notch shape acquiring unit 200 (notch shape acquiring means), a notch position misalignment calculating unit 210 (notch position misalignment calculating means), a rotational misalignment calculating unit 220 (rotational misalignment calculating means), an interface (I/F) unit 230 (center position misalignment acquiring means), and a controller 240.

The notch shape acquiring unit 200 acquires shape information of the notch N. The notch position misalignment calculating unit 210 calculates a positional misalignment between the notch N1 and the notch N2 using the shape information acquired by the notch shape acquiring unit 200. The I/F unit 230 receives the center position misalignment sent from the center position misalignment measuring device 2 and outputs the center position misalignment to the rotational misalignment calculating unit 220. The rotational misalignment calculating unit 220 calculates a rotational misalignment of the bonded wafer W using the center position misalignment measured by the center position misalignment measuring device 2 and the notch position misalignment calculated by the notch position misalignment calculating unit 210.

The controller 240 is constituted by a central processing unit (CPU) and the like and integrally controls the rotational misalignment measuring device 1 by outputting various instruction signals, transferring data, and the like to respective functional units that constitute the rotational misalignment measuring device 1. Hereinafter, a configuration will be described in which a computer 9 includes the notch position misalignment calculating unit 210, the rotational misalignment calculating unit 220, the I/F unit 230, and the controller 240.

The center position misalignment measuring device 2 measures diameters and a misalignment of center positions of the semiconductor wafers S1 and S2. While the center position misalignment measuring device 2 is described so as not to be included in the rotational misalignment measuring device 1 in the present embodiment, a configuration may also be adopted in which the rotational misalignment measuring device 1 includes the center position misalignment measuring device 2. In this case, the I/F unit 230 that is responsible for data transmission and reception to/from an external device is no longer required and the center position misalignment measuring device 2 corresponds to center position misalignment acquiring means. First, (1) a method of measuring a center position misalignment between the center position O1 of the semiconductor wafer S1 and the center position O2 of the semiconductor wafer S2 will be described.

(1) Method of Measuring Center Position Misalignment

Figure 4:
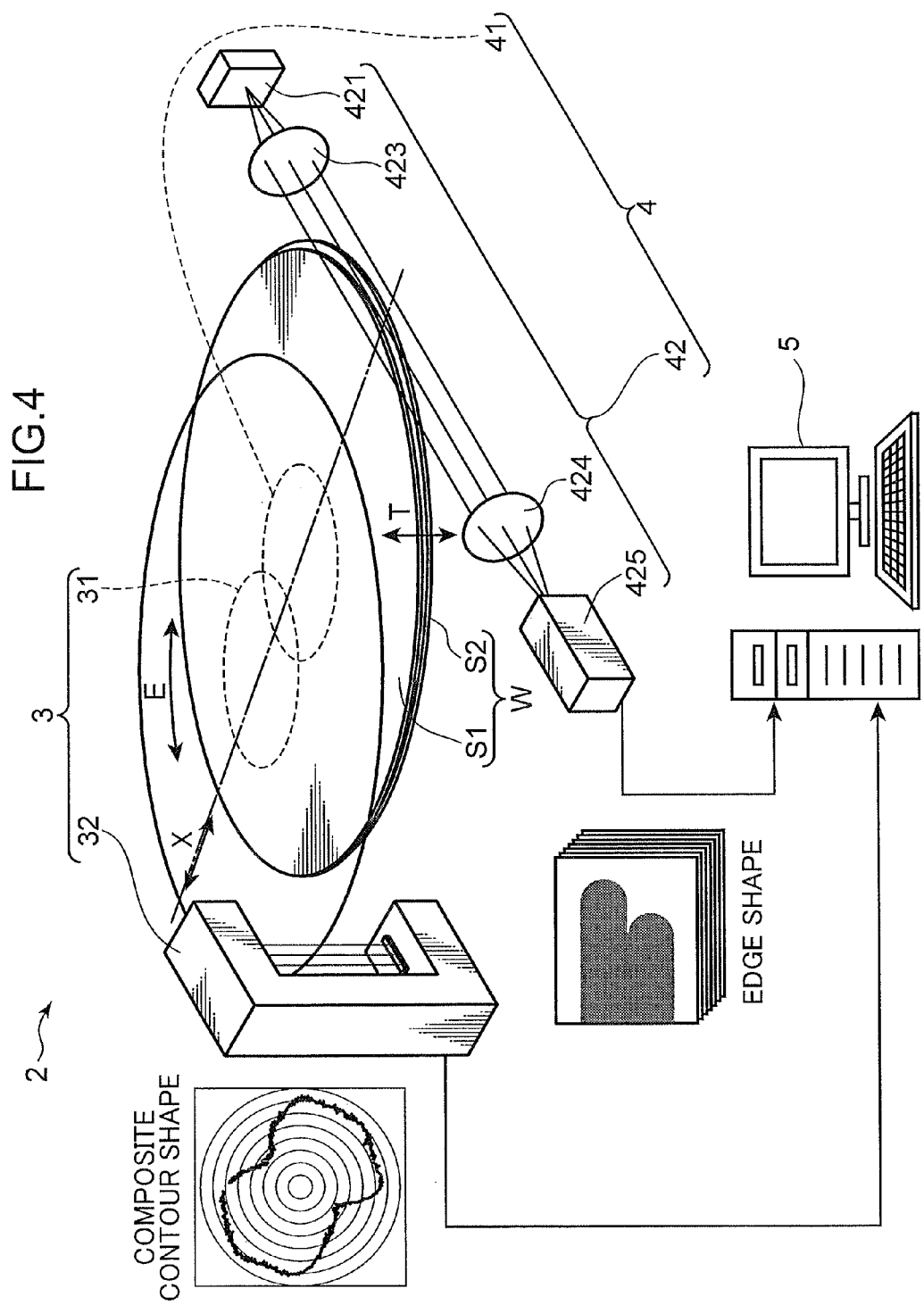
FIG. 4 is a diagram schematically showing an overall configuration of a center position misalignment measuring device.

FIG. 4 is a diagram schematically showing an overall configuration of the center position misalignment measuring device 2. The center position misalignment measuring device 2 is a device that measures diameters and a center position misalignment of the semiconductor wafers S1 and S2 and is configured so as to include a contour measuring unit 3, an edge shape measuring unit 4, and a computer 5. In this case, for example, a method described in Japanese Patent Application Laid-open No. 2012-7898 may be adopted for the center position misalignment measuring device 2. A description will be given below.

The contour measuring unit 3 detects a combined contour shape of the semiconductor wafers S1 and S2 from a projection image of the bonded wafer W in a thickness direction (a direction indicated by an arrow T). To this end, the contour measuring unit 3 is configured so as to include a rotatable turntable 31 on which the bonded wafer W is mounted, and an optical system 32 which is positioned in a vicinity of an outer circumferential edge portion of the bonded wafer W and irradiates, in the thickness direction of the bonded wafer W, slit light having a constant width in a radial direction of the bonded wafer W and which detects an outer shape of the bonded wafer W based on a variation in a width of a received light flux due to the rotation of the turntable 31.

Figure 5:
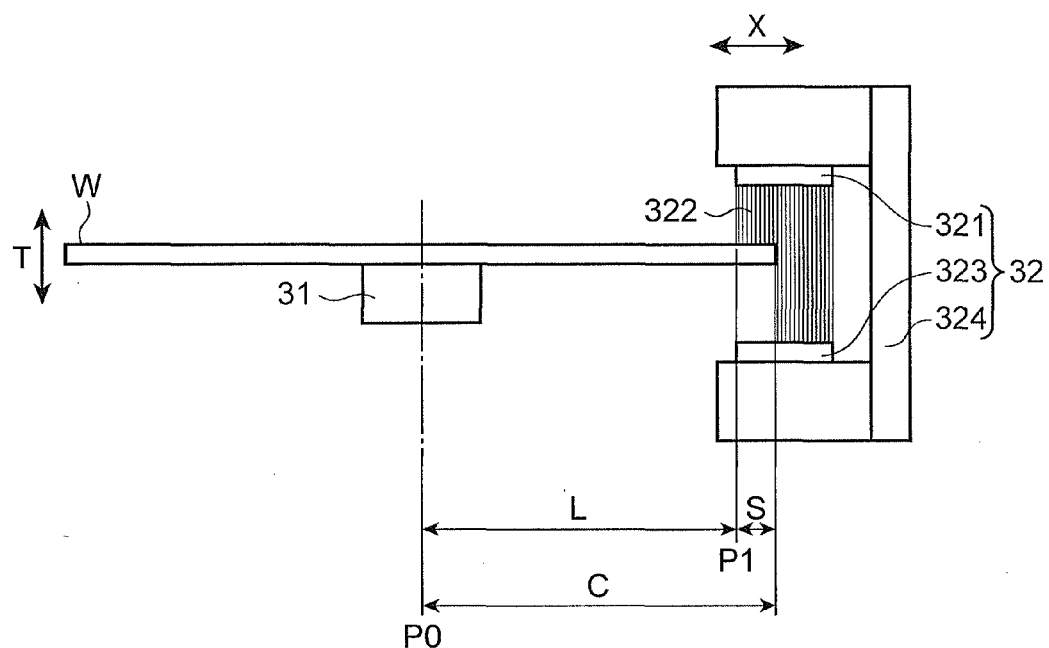
FIG. 5 is a diagram for explaining a measurement principle of a contour shape of a bonded wafer by a contour measuring unit.

FIG. 5 is a diagram for explaining a measurement principle of a contour shape of the bonded wafer W by the contour measuring unit 3. The optical system 32 is configured so as to include a slit light source 321 which generates slit light 322 that extends in a radial direction X of the bonded wafer W, a line sensor 323 which receives light having passed a vicinity of the outer edge portion of the bonded wafer W among the slit light 322, and a holding member 324 which holds the slit light source 321 and the line sensor 323 in a vicinity of the outer edge portion of the bonded wafer W so that the slit light source 321 and the line sensor 323 oppose each other. As the slit light 322, the slit light source 321 outputs mutually-parallel slit light that extends in the radial direction X of the bonded wafer W.

Therefore, by rotating the bonded wafer W with the turntable 31, minute irregularities in the contour of the bonded wafer W can be detected by the optical system 32 provided at a fixed position from a variation in a width of the slit light. Specifically, as expressed by Equation (B), an outer shape (contour) C can be obtained by adding a distance L between a center P0 of the turntable 31 and a reference position (sensor reference position) P1 to a variation in width (a distance of a shaded portion) S of the slit light from the reference position P1.

$$C = S + L \tag{B}$$

By having the computer 5 perform circle fitting based on contour position data of the bonded wafer W measured in this manner, a fitting diameter, an average diameter, and a center position can be calculated.

Meanwhile, by rotating the bonded wafer W with a turntable 41, the edge shape measuring unit 4 uses an optical system 42 provided at a fixed position to detect shapes of respective outer edge portions of the semiconductor wafers S1 and S2 at a plurality of points in a circumferential direction E from a projection image created by illuminating light that is irradiated in a tangential direction.

FIG. 6 is a diagram for explaining a measurement principle of a shape of an outer edge portion of the bonded wafer W by the edge shape measuring unit 4. The optical system 42 is configured so as to include a point light source 421 which radiates scattered light 420, a collimator lens 423 which creates parallel light 422 from the scattered light 420, a telecentric lens 424 which has a two-sided telecentric structure or an object-side telecentric structure and which collects the parallel light 422 having passed a vicinity of an edge, and an image sensor 425 which receives a projection image collected by the telecentric lens 424. The optical system 42 further includes a telecentric lens 426 which has an image-side telecentric structure and which inputs light to the image sensor 425, and an aperture stop 427.

Figure 7C:
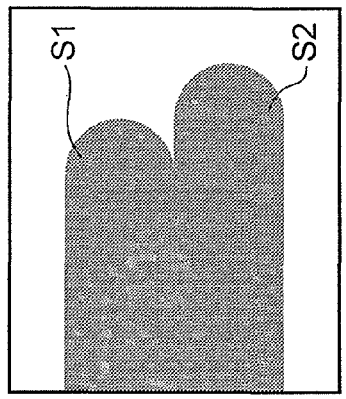
FIGS. 7A to 7F are diagrams showing examples of an image captured by an image sensor and a result of extracting a contour shape from the captured image.
Figure 7B:
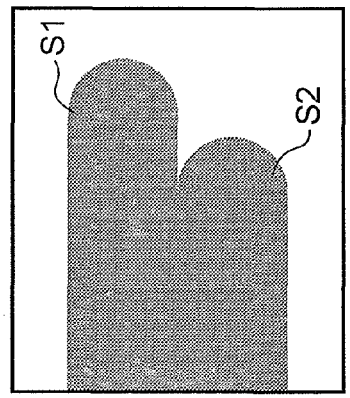
Figure 7A:
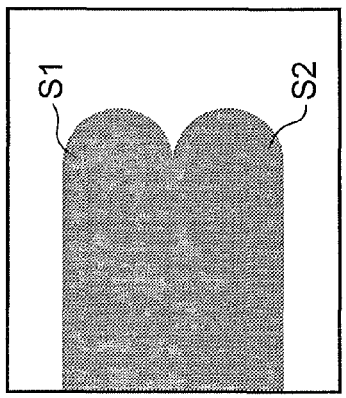

FIGS. 7A to 7F are diagrams showing examples of an image captured by the image sensor 425 and a result of extracting a contour shape from the captured image. FIG. 7 show the semiconductor wafers S1 and S2 which are true circles and which have a same diameter in a state where the semiconductor wafers S1 and S2 are misaligned in a diametrical direction at 135° (315°=(180°+135°)) from a predetermined reference position in the outer edge portion. As the predetermined reference position, for example, the notch bottom portion NB1 of the notch N1 of the semiconductor wafer S1 can be adopted. For example, at a notch position of the semiconductor wafer S1 or, in other words, a position of 45° (225°=(180°+45°)), the outer edge portions of the semiconductor wafers S1 and S2 are at approximately the same distance from a center as shown in FIG. 7A. In contrast, at the position of 135°, as shown in FIG. 7B, the outer edge portion of the semiconductor wafer S1 protrudes beyond the outer edge portion of the semiconductor wafer S2. Conversely, at the position of 315°, as shown in FIG. 7C, the edge of the semiconductor wafer S2 protrudes beyond the outer edge portion of the semiconductor wafer S1.

Figure 7F:
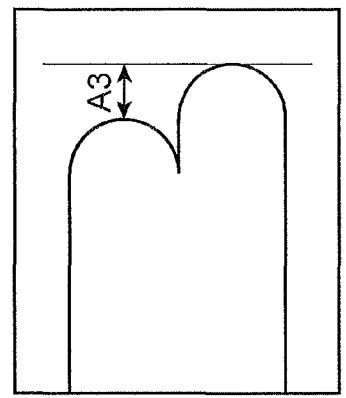
Figure 7E:
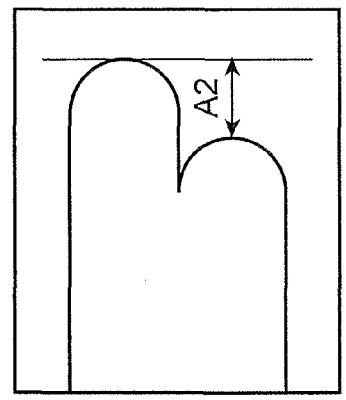
Figure 7D:
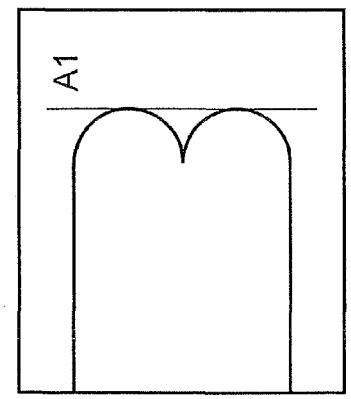

FIGS. 7D to 7F show results of extraction of contour shapes by the computer 5 from the captured images shown in FIGS. 7A to 7C. As shown in FIG. 7D, at a position of 45° (225°) that is perpendicular to the misalignment direction) (135°(315°)) of the semiconductor wafers S1 and S2 which are true circles and which have the same diameter, outer edge portion end faces A1 of the semiconductor wafers S1 and S2 are aligned. In this case, if a radius of the semiconductor wafer S1 as measured by the contour measuring unit 3 is denoted by r1, then radii of the semiconductor wafers S1 and S2 are both r1.

In contrast, as shown FIG. 7E, at the position of 135° where misalignment is maximum, the outer edge portion of the semiconductor wafer S1 protrudes beyond the outer edge portion of the semiconductor wafer S2 by A2. In this case, if a radius of the semiconductor wafer S1 as measured by the contour measuring unit 3 is denoted by r1, then a radius of the semiconductor wafer S2 is expressed by r1−A2. Similarly, as shown FIG. 7F, at the position of 315° where misalignment is maximum, the outer edge portion of the semiconductor wafer S2 protrudes beyond the outer edge portion of the semiconductor wafer S1 by A3. In this case, if a radius of the semiconductor wafer S2 as measured by the contour measuring unit 3 is denoted by r2, then a radius of the semiconductor wafer S1 is expressed by r2−A3.

In addition, when the diameters of the semiconductor wafers S1 and S2 are equal to each other, A2=A3 is satisfied. Based on diameters of the semiconductor wafers S1 and S2 at a plurality of locations obtained in this manner, the computer 5 calculates diameters, center positions, and a center position misalignment of the semiconductor wafers S1 and S2.

For example, let us assume that due to circle fitting based on a measurement result by the contour measuring unit 3, the radius of the semiconductor wafer S1 has been calculated as r1 and the radius of the semiconductor wafer S2 has been calculated as r2. Let us also assume that the measurement results shown in FIGS. 7A and 7C have been obtained from a measurement by the edge shape measuring unit 4. In this case, the radius of the semiconductor wafer S2 is calculated as r1−A2 at a position of 135° from the reference position. In addition, the radius of the semiconductor wafer S2 is calculated as r1+A3 at a position of 315° from the reference position. Based on these results, the computer 5 interpolates a measurement result of the outer edge portions of the semiconductor wafers S1 and S2 by the contour measuring unit 3 and once again performs circle fitting on the interpolated measurement result to obtain center positions and radii r1 and r2 of the semiconductor wafers S1 and S2.

When the semiconductor wafers S1 and S2 are misaligned as shown in FIG. 2, the contour measuring unit 3 is unable to measure an entire region of the outer edge portion of each of the semiconductor wafers S1 and S2. For example, in FIG. 2, a left-half region of the semiconductor wafer S2 indicated by a dotted line and a right-half region of the semiconductor wafer S1 indicated by a solid line cannot be measured. Therefore, when performing circle fitting based on this measurement result, radii and center positions of the semiconductor wafers S1 and S2 end up being respectively calculated from contour information corresponding to a semicircular outer edge portion. Consequently, radii and center positions of the semiconductor wafer S1 and S2 cannot be obtained accurately.

In addition, for example, there may be a case where the radius of the semiconductor wafer S2 is smaller than the radius of the semiconductor wafer S1 and the semiconductor wafer S2 is completely hidden inside the semiconductor wafer S1. In this case, a measurement result by the contour measuring unit 3 does not include information on the outer edge portion of the semiconductor wafer S2.

In consideration thereof, in the present embodiment, a shape of the outer edge portion of the bonded wafer W is detected by the edge shape measuring unit 4 in addition to the contour measuring unit 3. Accordingly, a shape of an entire region of the respective outer edge portions of the semiconductor wafers S1 and S2 can be measured by interpolating a measurement result obtained by the contour measuring unit 3 and respective radii and center positions of the semiconductor wafers S1 and S2 can be obtained accurately.

Moreover, while measurement results of three locations among the measurement results by the edge shape measuring unit 4 are shown in the example of FIG. 7, the edge shape measuring unit 4 may perform measurements at a larger number of locations such as in 60° increments, 45° increments, 30° increments, 10° increments, 5° increments, or 1° increments.

(2) Method of Measuring Notch Position Misalignment

Next, a method of measuring a notch position misalignment will be described.

The notch shape acquiring unit 200 shown in FIG. 3 need only acquire shape information of the notches N1 and N2 so that at least a position of the notch bottom portion NB2 of the semiconductor wafer S2 with respect to the notch bottom portion NB1 of the semiconductor wafer S1 can be identified. Hereinafter, as modes of the notch shape acquiring unit 200, a method of simultaneously acquiring shape information of the notches N1 and N2 from an opening side of the notch N will be first described through examples of (2-1) a method using specular reflection and (2-2) a method using a laser microscope. Next, a method of acquiring shape information of the notch N in a thickness direction (front and back direction) of the bonded wafer W will be described through examples of (2-3) a method using a camera and (2-4) a method using an infrared camera.

(2-1) Method Using Specular Reflection

Figure 8:
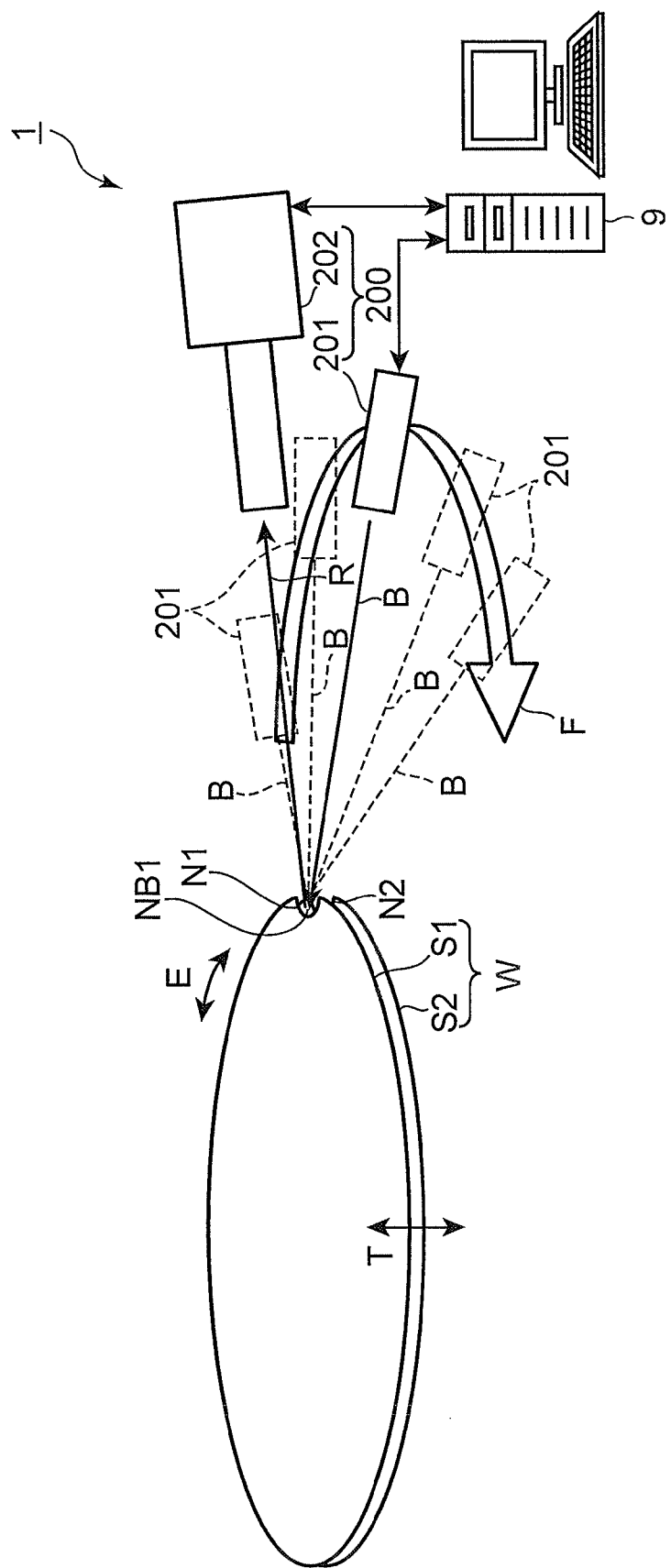
FIG. 8 is a diagram showing a configuration of a rotational misalignment measuring device in a case where shape information of a notch is acquired using specular reflection and a rotational misalignment is calculated.

FIG. 8 is a diagram showing a configuration of the rotational misalignment measuring device 1 in a case where shape information of the notch N is acquired using specular reflection and a rotational misalignment is calculated. A light source 201 and a camera 202 (imaging unit) correspond to the notch shape acquiring unit 200. The light source 201 is an output end of an optical fiber, a light-emitting diode, and the like, and is arranged at a position which is on a front side of the opening of the notch N and which is separated from the outer edge portion of the bonded wafer W by a predetermined interval and outputs light B toward the notch N.

In addition, the light source 201 irradiates the outer edge portion of the bonded wafer W including the notch N from a plurality of angles. In other words, the light source 201 is arranged so as to be positioned on an arc which follows the circumferential direction E on a single plane centered at the notch bottom portion NB.

Conceivable methods of irradiating the notch N include a method in which the light source 201 irradiates the notch N while moving in a range of a predetermined angle in the circumferential direction E as indicated by an arrow F and a method in which the light source 201 is arranged in plurality at predetermined angle intervals in the circumferential direction E and light is sequentially outputted from the light sources 201.

The former case is advantageous when an expensive or specialized light source is used (for example, when a particularly strong light source is required due to properties of the semiconductor wafer S) since only one light source is required. In a case where the light source 201 is moved, a drive device (not shown) including a motor that moves the light source 201 in the circumferential direction E is required.

In addition, in a case where a typical and inexpensive light source is used, by adopting the latter configuration, the need of a device such as a motor is eliminated and a light source unit can be constructed in a relatively simple and inexpensive manner. Moreover, drive control of the drive device and lighting control of the plurality of light sources are performed by a controller 240 of a computer 9.

The light source 201 depicted by a dotted line in FIG. 8 is a simplified illustration of the light source 201 in motion or an arrangement of a plurality of the light sources 201, and is not intended to limit a irradiation position with respect to the notch N.

The camera 202 is fixed at a position which is on a front side of the opening of the notch N and which is separated from the outer edge portion of the bonded wafer W by a predetermined interval, and by receiving and photoelectrically converting reflected light R that is specularly-reflected (regularly-reflected) by the outer edge portion of the bonded wafer W including the notch N among the light B outputted by the light source 201, outputs a two-dimensional brightness distribution of the reflected light R as an image. A focus of the camera 202 is set on the notch bottom portion NB.

Figure 9:
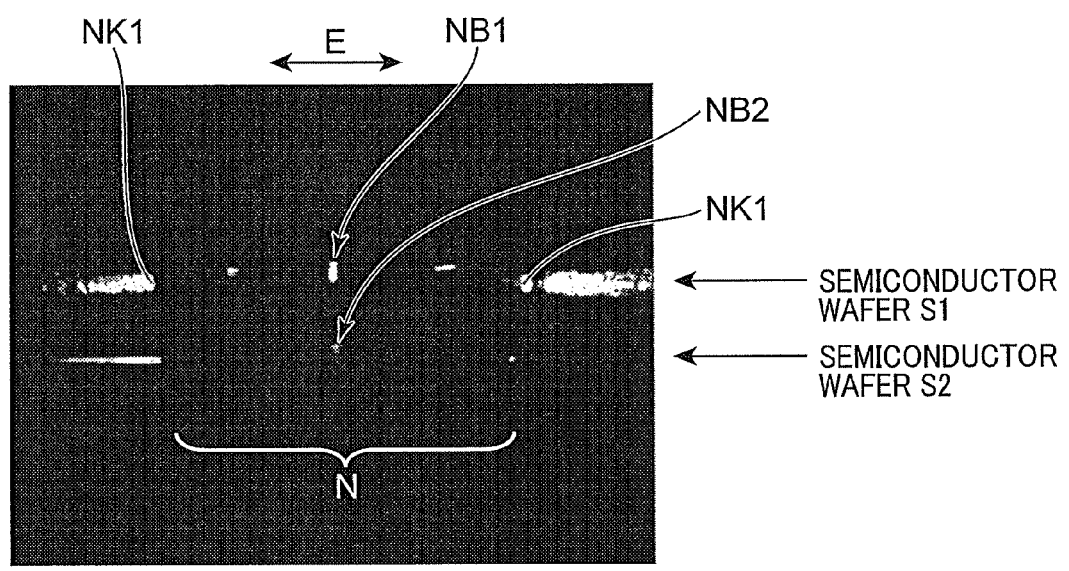
FIG. 9 is a diagram showing an example of an image photographed by a camera in a case where a light source irradiates light from a position on a plane which includes a center and a notch bottom portion of a semiconductor wafer and which is parallel to a thickness direction.

FIG. 9 shows an example of an image photographed by the camera 202 when light is irradiated from the front (a position in a normal direction with respect to a plane angle of the notch bottom portion NB) of the opening of the notch N. Among the light B outputted by the light source 201, the reflected light R that is specularly-reflected is incident to the camera 202. In other words, an image photographed by the camera 202 is an image representing a brightness distribution of the reflected light R. In this image, a peak position of brightness (a peak brightness position) corresponds to a position where the light B is specularly-reflected.

More specifically, among a white portion shown in FIG. 9, an upper side corresponds to the notch bottom portion NB1 of the semiconductor wafer S1 and the outer edge portion of the semiconductor wafer S1 other than the notch N1, and a lower side corresponds to the notch bottom portion NB2 of the semiconductor wafer S2 and the outer edge portion of the semiconductor wafer S2 other than the notch N2. Since specularly-reflected light is not incident to the camera 202 at edge portions of the notch N other than the notch bottom portion NB, such edge portions are not shown in an image. Therefore, a portion indicated by a curly bracket in FIG. 9 corresponds to the notches N1 and N2.

In addition, on a plane of a specular reflection position in the outer edge portion, an incidence angle of light and a reflection angle with reference to a normal direction of the plane are equal to each other. Therefore, based on a peak brightness position in an image photographed by the camera 202 and an irradiation direction (a direction from a position of the light source 201 toward the notch bottom portion NB) of the light B with respect to the outer edge portion, a position where the light B is specularly-reflected in the outer edge portion and a plane angle of the specular reflection position can be uniquely calculated.

FIGS. 10A and 10B are diagrams for explaining reference numerals indicating a light irradiating direction and the like. FIG. 10A is a plan view of the rotational misalignment measuring device 1 shown in FIG. 8 as seen from above, and shows only the semiconductor wafer S1 as the bonded wafer W. In addition, FIG. 10B is an enlarged view of the notch N1.

As shown in FIG. 10A, an irradiation angle of the light B with reference to a direction of a straight line connecting the notch bottom portion NB1 and the camera 202 (hereinafter referred to as a front-of-camera direction") is denoted by φ. In addition, an angle between a specular reflection position Nx of the light B in the outer edge portion of the bonded wafer W and a plane perpendicular to a front-of-camera direction (hereinafter referred to as an "X-Y plane" in the sense that the plane corresponds to an X-Y plane in a captured image) is assumed to be a plane angle θs. In this case, the specular reflection position Nx represents a position on the outer edge portion of the bonded wafer W which specularly-reflects the light B. Furthermore, the plane angle θs represents a gradient of the outer edge portion of the bonded wafer W at the specular reflection position Nx with reference to the X-Y plane.

Figure 11:
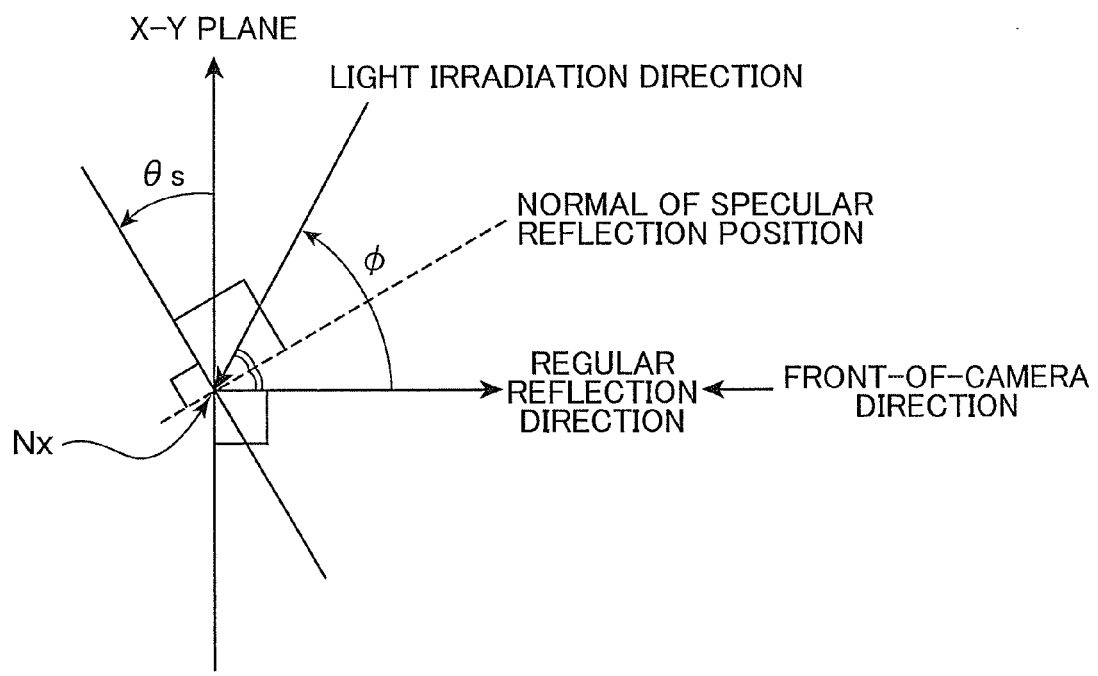
FIG. 11 is a diagram for explaining a principle of measuring a plane angle.

FIG. 11 is a diagram for explaining a measurement principle of the plane angle θs. When the camera 202 is a telecentric camera, since the direction of the reflected light R incident to the camera 202 and a front direction of the camera 202 are approximately parallel to each other, a peak brightness position in a captured image corresponds to the specular reflection position Nx of the light B. Furthermore, an angle (irradiation angle φ) between the incidence angle and the reflection angle of light B is bisected by a normal of the specular reflection position Nx. Therefore, since (90−θs−φ/2)=(90−φ), Equation (C) below is true.

$$\theta s = \phi/2 \quad (C)$$

Accordingly, the notch position misalignment calculating unit 210 can identify the specular reflection position Nx based on a peak brightness position of an image photographed by the camera 202 and can further identify the plane angle θs at the specular reflection position Nx based on an irradiation angle φ (a known angle) of the light B that is determined in accordance with a position of the light source 201.

In other words, by having the controller 240 move the light source 201 in a direction of the arrow F shown in FIG. 8 while the light source 201 is being lighted (when a plurality of the light sources 201 is arranged, by sequentially switching activation of the light sources 201), the irradiation angle φ is changed. In addition, the notch position misalignment calculating unit 210 can acquire an image of the notch N through the camera 202 and obtain, through the acquired image, a plane angle θs for each of irradiation angles φ of a plurality of lights B. In other words, the notch position misalignment calculating unit 210 can obtain a distribution of the plane angle θs of the outer edge portion of the bonded wafer W including the notch N.

Moreover, when a shape or a reflectance of an outer edge portion of the bonded wafer W varies, a brightness of the reflected light R also varies. When the brightness of the reflected light R varies, an image with a different definition is obtained by photography and a peak brightness position can no longer be analyzed accurately. Therefore, in order to obtain reflected light R with optical brightness, photography is desirably performed by varying irradiation conditions or photographic conditions such as a light intensity of the light source 201 and a sensitivity or an exposure time of the camera 202.

Figure 12:
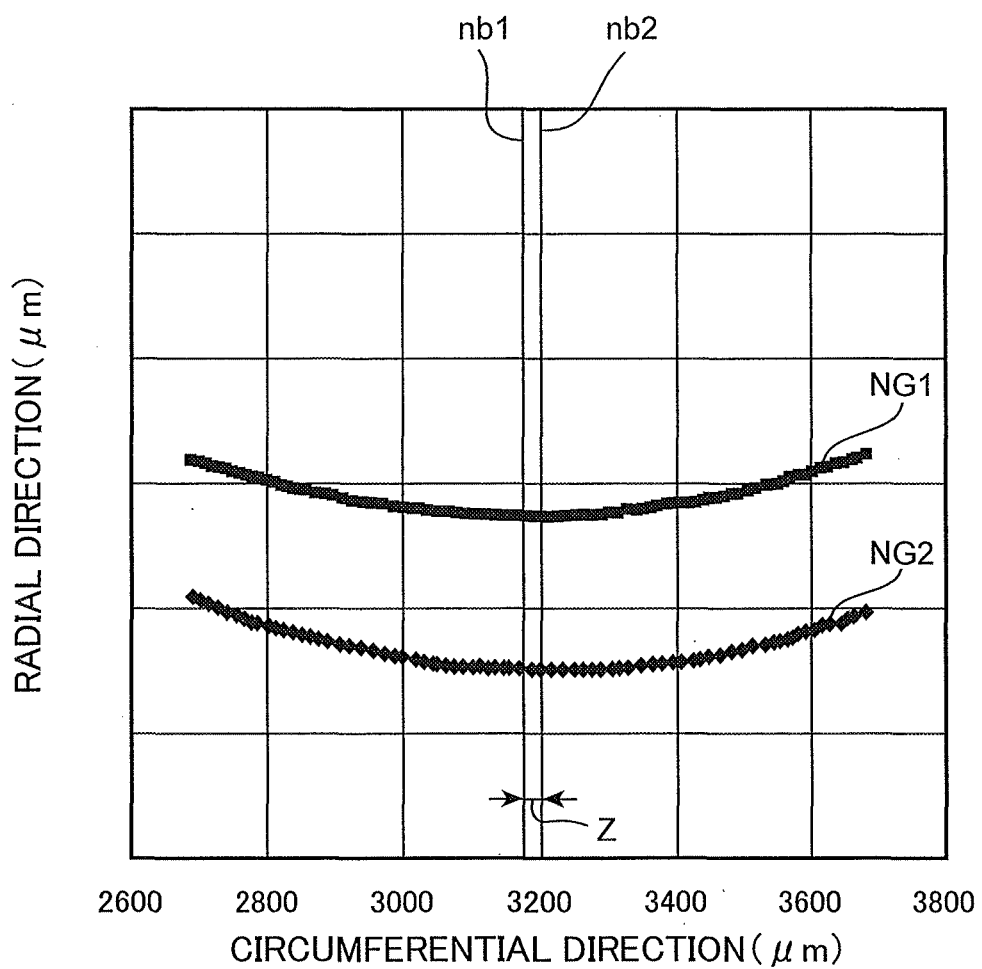
FIG. 12 is a graph showing a result of computation by a notch position misalignment calculating unit.

FIG. 12 is a graph showing a result of computation by the notch position misalignment calculating unit 210. An abscissa represents a circumferential direction and an ordinate represents a radial direction of the semiconductor wafers S1 and S2. In addition, the ordinate and the abscissa have a scale resolution of 200 μm. The notch position misalignment calculating unit 210 calculates a plane angle θs of the notches N1 and N2 from an image photographed by the camera 202, obtains a shape of the notch N by connecting adjacent plane angles θs, and performs fitting of the shape using a function. While a notch shape is represented in FIG. 12 using a quadratic function, a notch shape may alternatively be represented by a polynomial with another order, a circle, and the like. In FIG. 12, a graph NG1 represents a shape of the notch N1 and a graph NG2 represents a shape of the notch N2.

Moreover, a major significance of a graph obtained by the notch position misalignment calculating unit 210 is in a shape of a notch indicated by the graph and in positional information of an abscissa (x coordinate), and positional information of an ordinate (y coordinate) is not particularly significant. This is because the only information that can be obtained from a shape measurement of the notch N by the notch shape acquiring unit 200 (in other words, an image photographed by the camera 202 shown in FIG. 9) is x direction coordinate values and a plane angle θs at each position in the x direction. When reproducing the shape of the notch N, the plane angle θs at each position in the x direction is sequentially integrated starting at a left end (or a right end). However, a y direction coordinate value of the first integrated point cannot be determined. Therefore, the ordinate (y coordinates) shown in FIG. 12 has no significance.

In addition, the notch position misalignment calculating unit 210 obtains a central axis nb1 of the graph NG1 and a central axis nb2 of the graph NG2, and obtains a difference Z between an x coordinate of the central axis nb1 and an x coordinate of the central axis nb2. The difference Z corresponds to a notch position misalignment. Moreover, a straight line that connects a vertex of the graph NG1 and the center position of the semiconductor wafer S1 can be adopted as the central axis nb1. Furthermore, in a similar manner to the central axis nb1, a straight line that connects a vertex of the graph NG2 and the center position of the semiconductor wafer S2 can be adopted as the central axis nb2.

The rotational misalignment calculating unit 220 calculates a rotational misalignment using a center position misalignment retrieved from the center position misalignment measuring device 2 via the I/F unit 230 and the difference Z or, in other words, a notch position misalignment calculated by the notch position misalignment calculating unit 210. When the rotational misalignment is obtained using the Equation (A) presented earlier, x2 represents the difference Z. In this manner, the rotational misalignment calculating unit 220 can obtain a rotational misalignment θ.

$$\theta = \tan^{-1}\{(x2-x1)/(r-d1)\} \quad (A)$$

Moreover, while the notch position misalignment calculating unit 210 obtains a notch position misalignment by analyzing a position of the notch bottom portion NB in the description given above, the notch position misalignment calculating unit 210 may alternatively be configured so as to further analyze a position of the notch shoulder portion NK to obtain a notch position and calculate a notch position misalignment. In the case of the semiconductor wafer S1, a notch position is determined by three points including the notch bottom portion NB1 and the notch shoulder portions NK.

However, when the focus of the camera 202 is set to the notch bottom portion NB, since the notch shoulder portion NK is photographed out-of-focus, the notch position misalignment calculating unit 210 may not be able to accurately detect a position of the notch shoulder portion NK. Alternatively, since a plane angle θs in a vicinity of the notch shoulder portion NK cannot be accurately calculated due to a curvature of the notch shoulder portion NK being greater than a curvature of the notch bottom portion NB, a position of the notch shoulder portion NK may not be accurately obtained.

In consideration thereof, the notch position misalignment calculating unit 210 obtains weighted average values for a detected position of the notch bottom portion NB and a detected position of the notch shoulder portion NK. In other words, by obtaining weighted average values so that the detected position of the notch bottom portion has a higher importance and the detected position of the notch shoulder portion has a lower importance, an optimum notch position can be calculated.

(2-2) Method Using Laser Microscope

FIG. 13 is a diagram showing a configuration of the rotational misalignment measuring device 1 in a case where shape information of the notch N is acquired using a laser microscope. A laser microscope 203 corresponds to the notch shape acquiring unit 200. The laser microscope 203 is constituted by a laser light source, an optical lens, a light receiving element, and the like, and is arranged at a position which is on a front side of the opening of the notch N and which is separated from the outer edge portion of the bonded wafer W by a predetermined interval. The laser microscope 203 receives light reflected by the notch N among laser light outputted from the laser light source by the light receiving element via the optical lens. In addition, the laser microscope 203 photoelectrically converts the light received by the light receiving element and generates an image that visually augments the notch N, and outputs the image to the computer 9.

The notch position misalignment calculating unit 210 of the computer 9 analyzes positions of the notch bottom portion NB1 and the notch bottom portion NB2 from the augmented image photographed by the laser microscope 203 and calculates a notch position misalignment x2. In addition, the rotational misalignment calculating unit 220 calculates a rotational misalignment θ according to the Equation (A) above or the like using a center position misalignment x1 retrieved from the center position misalignment measuring device 2 via the I/F unit 230 and the notch position misalignment x2 calculated by the notch position misalignment calculating unit 210.

As described above, when the (2-1) method using a specular reflection and the (2-2) method using a laser microscope are adopted, the notch shape acquiring unit 200 can simultaneously acquire shape information of the notches N1 and N2. Therefore, the notch position misalignment calculating unit 210 can analyze a position of the semiconductor wafer S2 with respect to the semiconductor wafer S1 based on a single piece of shape information and can accurately measure a distance between the notch N1 and the notch N2. As a result, a notch position misalignment can be accurately obtained and a rotational misalignment can be accurately calculated.

(2-3) Method Using Camera Group

Figure 14:
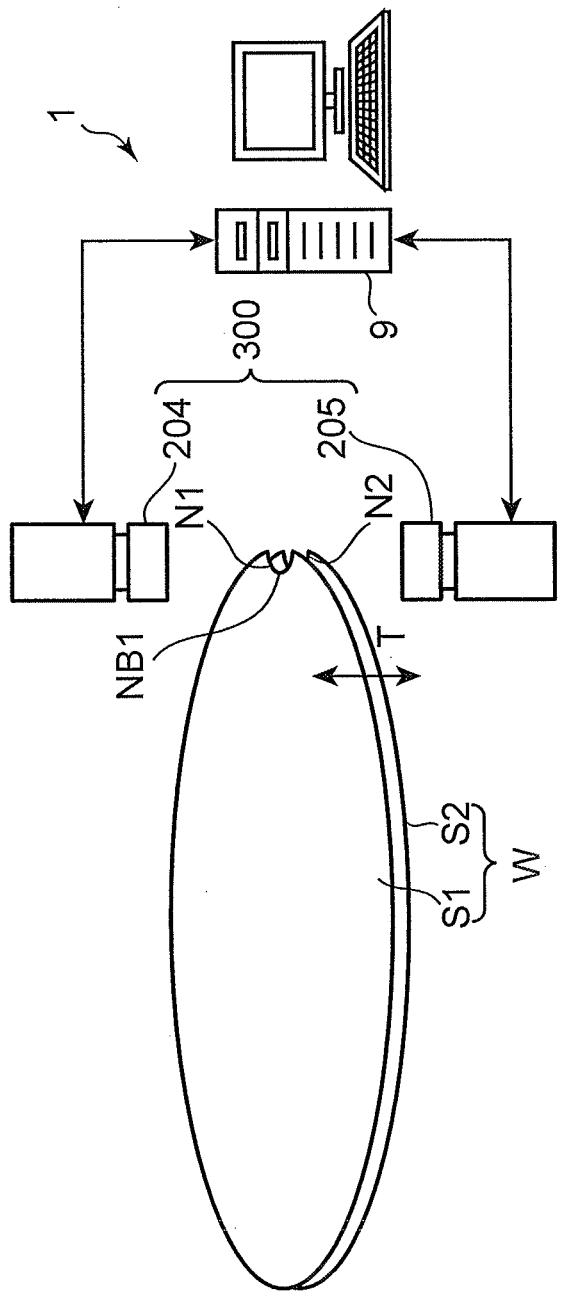
FIG. 14 is a diagram showing a configuration of a rotational misalignment measuring device in a case where shape information of a notch is acquired using a camera group.

FIG. 14 is a diagram showing a configuration of the rotational misalignment measuring device 1 in a case where shape information of the notch N is acquired using a camera group. A camera 204 (first imaging unit) and a camera 205 (second imaging unit) correspond to the notch shape acquiring unit 200. Hereinafter, the camera 204 and the camera 205 will be collectively referred to as a "camera group 300". The cameras of the camera group 300 are respectively arranged at positions which oppose each other in a thickness direction (a direction indicated by an arrow T) across the bonded wafer W and which are separated from the notch N by predetermined intervals.

In other words, the camera 204 is arranged at a position which is on the side of the semiconductor wafer S1 and which is separated from the notch N1 by a predetermined distance in a thickness direction of the semiconductor wafer S, and photographs the notch N1. In this case, a focus of the camera 204 is set to the outer edge portion of the notch N1. In addition, the camera 205 is arranged at a position which is on the side of the semiconductor wafer S2 and which is separated from the notch N2 by a predetermined distance in a thickness direction of the semiconductor wafer S, and photographs the notch N2. In this case, a focus of the camera 205 is set to the outer edge portion of the notch N2. Furthermore, the cameras 204 and 205 output photographed images to the computer 9.

When a surface of the semiconductor wafer S is a specular surface, a coaxial epi-illumination light source is desirably used as a light source that irradiates the semiconductor wafer S. By using a coaxial epi-illumination light source, only light reflected by the surface of the semiconductor wafer S proceeds toward the camera group 300, and light reflected by the outer edge portion of the semiconductor wafer S or a background of the semiconductor wafer S does not proceed toward the camera group 300. As a result, image processing for extracting a contour of the semiconductor wafer S can be readily performed by the notch position misalignment calculating unit 210.

FIGS. 15A and 15B are diagrams showing examples of an image photographed by the camera group 300. FIG. 15A shows an image 71 photographed by the camera 204 and FIG. 15B shows an image 72 photographed by the camera 205. The notch position misalignment calculating unit 210 respectively retrieves the images 71 and 72 photographed by the cameras 204 and 205, and analyzes positions of the notch bottom portion NB1 and the notch bottom portion NB2 from both images to calculate a positional misalignment.

For example, assuming that a horizontal direction on the plane of paper represents an x axis and a vertical direction on the plane of paper represents a y axis, the notch position misalignment calculating unit 210 analyzes a position of the notch bottom portion NB1 from the image 71 and converts the position into coordinates in the image (coordinates (xa, ya)). In a similar manner, the notch position misalignment calculating unit 210 analyzes a position of the notch bottom portion NB2 from the image 72 and converts the position into coordinates in the image (coordinates (xb, yb)). The notch position misalignment calculating unit 210 then derives a difference between the x coordinate of the notch bottom portion NB1 and the x coordinate of the notch bottom portion NB2 (a difference between xa and xb) as a notch position misalignment.

Moreover, a relative relationship between respective photographic fields of vision of the cameras 204 and 205 is desirably calibrated in advance. For example, when an object is simultaneously photographed by the cameras 204 and 205, a center of the object is ideally conformed to centers of an image photographed by the camera 204 and an image photographed by the camera 205. However, since it is difficult to precisely match positions of the cameras 204 and 205, even if a same object is photographed at the same time, positions of the object in images photographed by the cameras 204 and 205 may differ from each other.

In consideration thereof, an error in centers of the photographic fields of vision of the cameras 204 and 205 is measured (calibrated) in advance. Subsequently, by having the notch position misalignment calculating unit 210 perform positional compensation using the error when calculating a notch position misalignment, an accurate notch position misalignment can be obtained.

(2-4) Method Using Infrared Camera

FIG. 16 is a diagram showing a configuration of the rotational misalignment measuring device 1 in a case where shape information of the notch N is acquired using an infrared camera. An infrared camera 207 (infrared camera) and an infrared light source 206 correspond to the notch shape acquiring unit 200. The infrared camera 207 and the infrared light source 206 are respectively arranged at positions which oppose each other in a thickness direction (a direction indicated by an arrow T) across the bonded wafer W and which are separated from the notch N by predetermined intervals. Moreover, while the infrared camera 207 is arranged on the side of the semiconductor wafer S1 and the infrared light source 206 is arranged on the side of the semiconductor wafer S2 in FIG. 16, a reverse arrangement may also be adopted.

The infrared light source 206 irradiates an infrared light Ir toward the outer edge portion of the bonded wafer W including the notch N from the side of the semiconductor wafer S2. The infrared light Ir transmitted through the semiconductor wafer S is retrieved by the infrared camera 207 and photoelectrically converted to generate an image. Although the infrared light Ir incident to a planar portion of the semiconductor wafer S is transmitted as-is, the infrared light incident to the outer edge portion is refracted or reflected and therefore does not enter the infrared camera 207. Therefore, by analyzing an image photographed by the infrared camera 207, the notch position misalignment calculating unit 210 is able to obtain the outer edge portion of the semiconductor wafer S and, further, calculate a position of the notch bottom portion NB of the semiconductor wafer S.

Figure 17:
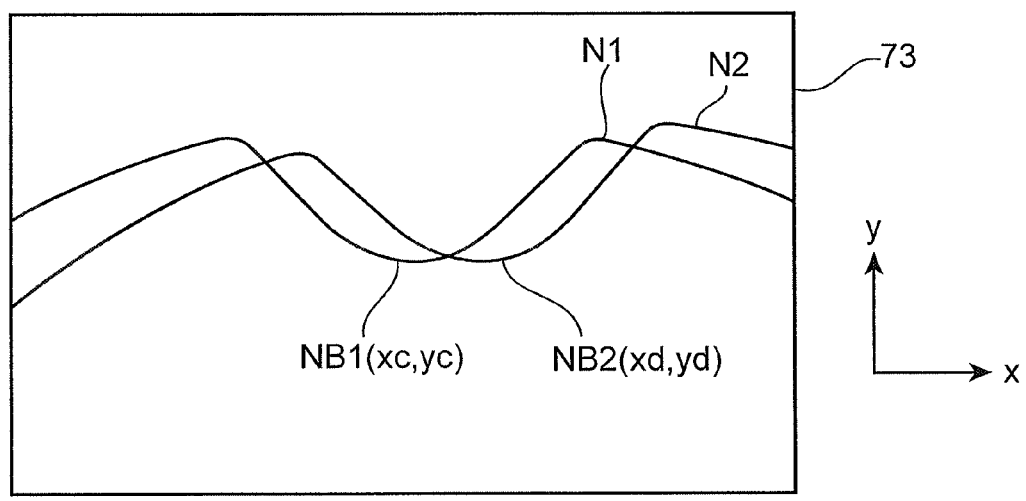
FIG. 17 is a diagram showing an example of an image photographed by an infrared camera.

FIG. 17 is a diagram showing an image 73 photographed by the infrared camera 207. The notch position misalignment calculating unit 210 analyzes positions of the notch bottom portion NB1 and the notch bottom portion NB2 from the image 73 photographed by the infrared camera 207 to calculate a positional misalignment.

For example, assuming that a horizontal direction on the plane of paper represents an x axis and a vertical direction on the plane of paper represents a y axis, the notch position misalignment calculating unit 210 analyzes positions of the notch bottom portions NB1 and NB2 from the image 73 and converts the positions into coordinates in the image to obtain coordinates (xc, yc) and coordinates (xd, yd). The notch position misalignment calculating unit 210 then derives a difference between the x coordinate of the notch bottom portion NB1 and the x coordinate of the notch bottom portion NB2 (a difference between xc and xd) as a notch position misalignment.

As described above, with the (2-3) method of using a camera group and the (2-4) method of using an infrared camera, the notch position misalignment calculating unit 210 is able to analyze a positional relationship of the semiconductor wafer S2 with respect to the semiconductor wafer S1 using shape information of the notches N1 and N2 acquired from one of or both of the surfaces of the bonded wafer W and, further, obtain a distance from the notch N1 to the notch N2 as a notch position misalignment. In addition, the rotational misalignment calculating unit 220 is able to obtain a rotational misalignment using the notch position misalignment and the center position misalignment.

(Method of Manufacturing Bonded Wafer)

Next, a method of manufacturing the bonded wafer W according to the present embodiment will be described. The method of manufacturing the bonded wafer W according to the present embodiment features performing an inspection of the bonded wafer W using the method of measuring a rotational misalignment employed by the rotational misalignment measuring device described above.

In the following description, a bonded wafer W manufactured by bonding together a disk-like semiconductor substrate having a notch formed in an outer edge portion thereof and a disk-like supporting substrate having a notch formed in an outer edge portion thereof is adopted as the bonded wafer W. In addition, in the following description, a CCD, a CMOS image sensor, or the like is adopted as the bonded wafer W.

FIGS. 18A, 18B and 18C are diagrams showing a manufacturing process of the bonded wafer W according to an embodiment of the present invention. First, as shown in FIG. 18A, a semiconductor substrate 1801 and a supporting substrate 1802 are prepared. The semiconductor substrate 1801 is supplied as a semiconductor wafer. The supporting substrate 1802 is supplied as a similar wafer-shaped substrate.

A silicon (Si) substrate or the like is used as the semiconductor substrate 1801. For example, a light-receiving unit such as a photodiode, a wiring layer for feeding a signal received by the light-receiving unit, and the like are provided on a first primary surface 1801a of the semiconductor substrate 1801.

For example, a light-permeable member such as a glass substrate is applied as the supporting substrate 1802. The supporting substrate 1802 according to the present embodiment is also used as a light-permeable protective member for the light-receiving unit provided on the first primary surface 1801a. A glass substrate including, for example, borosilicate glass, silica glass, or soda-lime glass is used as the supporting substrate 1802. A glass substrate or the like with approximately the same size as or a slightly larger size than the semiconductor substrate 1801 is prepared as the supporting substrate 1802 and is arranged on the first primary surface 1801a of the semiconductor substrate 1801.

Next, as shown in FIG. 18B, an adhesive layer 1803 is applied to an outer circumferential region of the first primary surface 1801a of the semiconductor substrate 1801 with the exception of the light-receiving unit. Subsequently, as shown in FIG. 18C, the semiconductor substrate 1801 and the supporting substrate 1802 are bonded to each other. As the adhesive layer 1803, an adhesive is adopted which includes a photosensitive or non-photosensitive epoxy resin, polyimide resin, acrylic resin, silicone resin, or the like. The adhesive layer 1803 is formed in a vacuum by lamination, roll coating, or the like.

The semiconductor substrate 1801 and the supporting substrate 1802 are bonded together by hot pressing (vacuum hot pressing and the like) via the adhesive layer 1803.

When bonding the semiconductor substrate 1801 and the supporting substrate 1802 to each other, the notch N shown in FIG. 1 is used. In other words, the semiconductor substrate 1801 and the supporting substrate 1802 are bonded to each other so that the notch N1 provided in an outer edge portion of the semiconductor substrate 1801 and the notch N2 provided in an outer edge portion of the supporting substrate 1802 overlap each other.

Next, as shown in FIG. 19, a thinning process is performed on the semiconductor substrate 1801. In other words, at the semiconductor substrate 1801, a second primary surface 1801b on an opposite side to the first primary surface 1801a is processed by mechanical polishing, chemical mechanical polishing (CMP), wet etching, dry etching, or the like and is thinned until a thickness of the semiconductor substrate 1801 is reduced to a predetermined thickness.

Figure 20:
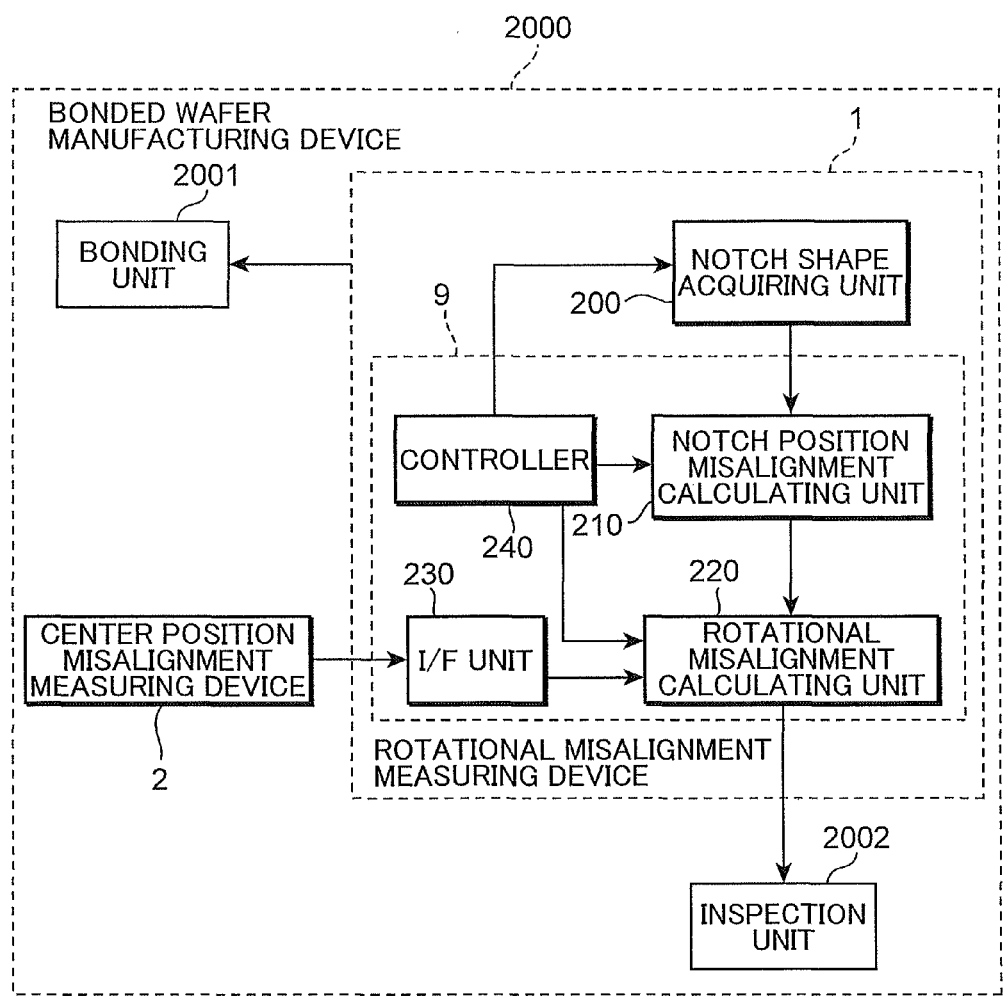
FIG. 20 is a block diagram showing a bonded wafer manufacturing device according to an embodiment of the present invention.

FIG. 20 is a block diagram showing a bonded wafer manufacturing device according to an embodiment of the present invention. In addition to the rotational misalignment measuring device 1 and the center position misalignment measuring device 2, the bonded wafer manufacturing device includes a bonding unit 2001 and an inspection unit 2002.

The bonding unit 2001 is a device that performs a bonding process shown in FIGS. 18A, 18B, 18C, and 19. Specifically, the bonding unit 2001 includes a first stage which holds the semiconductor substrate 1801, a second stage which holds the supporting substrate 1802, an application mechanism which applies the adhesive layer 1803 to the semiconductor substrate 1801, a bonding mechanism which positions the notch N1 of the semiconductor substrate 1801 and the notch N2 of the supporting substrate 1802 and which bonds the semiconductor substrate 1801 and the supporting substrate 1802 to each other, and the like.

The inspection unit 2002 is constituted by a computer or the like and judges whether or not a rotational misalignment of the bonded wafer W as calculated by the rotational misalignment calculating unit 220 is equal to or greater than a default value. When the rotational misalignment is equal to or greater than the default value, the inspection unit 2002 determines that the bonded wafer W is defective. On the other hand, when the rotational misalignment is smaller than the default value, the inspection unit 2002 determines that the bonded wafer W is non-defective. Subsequently, when the inspection unit 2002 determines that the bonded wafer W is defective, the inspection unit 2002 may notify a user that the bonded wafer W in question is defective by having a display device (not shown) display that the bonded wafer W in question is defective. Alternatively, a sorting mechanism (not shown) which sorts bonded wafers W into those that are defective and those that are non-defective may be provided, in which case the inspection unit 2002 may have the sorting mechanism sort bonded wafers W into those that are defective and those that are non-defective.

The following is a summary of the technical features of the invention.

A rotational misalignment measuring device according to an aspect of the present invention is a rotational misalignment measuring device of a bonded substrate which detects a rotational misalignment between respective substrates of a bonded substrate in which a plurality of disk-like substrates each having a notch formed in an outer edge portion thereof is stacked on top of each other and bonded together in a thickness direction of the substrates, the rotational misalignment measuring device including: center position misalignment acquiring means for acquiring a center position misalignment that is a misalignment of a center position of each substrate; notch shape acquiring means for acquiring shape information of a notch of each substrate; notch position misalignment calculating means for obtaining a notch position of each substrate from the notch shape information and calculating, from the notch position, a notch position misalignment that is a misalignment of notch positions between the respective substrates; and rotational misalignment calculating means for calculating a rotational misalignment between the respective substrates based on the center position misalignment and the notch position misalignment.

According to this configuration, shape information of a notch of a substrate constituting a bonded substrate is acquired by the notch shape acquiring means, and a positional misalignment between notches is calculated by the notch position misalignment calculating means from acquired shape information. In addition, a rotational misalignment between substrates is calculated by the rotational misalignment calculating means using a notch position misalignment and a center position misalignment between substrates. As a result, a rotational misalignment can be obtained with high accuracy.

Moreover, a substrate according to the present invention refers to a disk-like plate made of a material such as a semiconductor, glass, and sapphire which is mainly used in an electronic circuit board. In addition, besides a configuration in which substrates made of the same material are bonded to each other such as the bonding of semiconductor substrates or the bonding of glass substrates, a bonded substrate also includes a configuration in which different materials are bonded to each other such as the bonding of a semiconductor substrate and a glass substrate. Furthermore, a notch refers to an approximately semicircular (recessed shape) notched portion that is formed in an outer edge portion of a substrate.

In addition, in the configuration described above, favorably, any one of the plurality of substrates is assumed to be a reference substrate, the center position misalignment acquiring means acquires, as the center position misalignment a misalignment between a reference center position that is a center position of the reference substrate and a center position of a substrate other than the reference substrate, the notch position misalignment calculating means calculates, as the notch position misalignment a misalignment between a reference notch position that is a notch position of the reference substrate and a notch position of the substrate other than the reference substrate, and the rotational misalignment calculating means uses the center position misalignment and the notch position misalignment to calculate, as the rotational misalignment, an angle between a straight line connecting the center position and the notch position of the reference substrate and a straight line connecting the center position and the notch position of the substrate other than the reference substrate.

For example, let us consider a case where a bonded substrate is constituted by two substrates (a substrate A and a substrate B) and the substrate A is assumed to be a reference substrate. In this case, first, the center position misalignment acquiring means acquires a center position misalignment indicating a distance between a center of the substrate A and a center of the substrate B. The notch shape acquiring means then acquires shape information of a notch of the substrate A and shape information of a notch of the substrate B. Using the respective pieces of shape information, the notch position misalignment calculating means calculates a notch position misalignment indicating a misalignment between a notch position of the substrate A and a notch position of the substrate B. Subsequently, using the center position misalignment and the notch position misalignment, the rotational misalignment calculating means calculates an angle between a straight line connecting the center and the notch position of the substrate A and a straight line connecting the center and the notch position of the substrate B as a rotational misalignment. As a result, a rotational misalignment can be obtained with high accuracy.

Moreover, in a case where a bonded substrate is constituted by three or more substrates (a substrate A, a substrate B, and a substrate C) and the substrate A is assumed to be a reference substrate, the rotational misalignment calculating means may calculate a rotational misalignment between the substrate A and the substrate B and a rotational misalignment between the substrate A and the substrate C.

Furthermore, in the configuration described above, favorably, the notch shape acquiring means is arranged on a front side of an opening of the notch and simultaneously acquires shape information of the notches of all of the substrates.

According to this configuration, the notch shape acquiring means simultaneously acquires shape information of notches of all of the substrates constituting the bonded substrate from the front side of notch openings. Therefore, the notch position misalignment calculating means is able to analyze a positional relationship of another substrate with respect to the reference substrate from one piece of shape information among simultaneously acquired pieces of shape information. In other words, the notch position misalignment calculating means is able to accurately measure a distance from a notch position of the reference substrate to a notch position of another substrate (notch position misalignment) and a measuring accuracy of a notch position misalignment can be improved.

In addition, in the configuration described above, favorably, the notch shape acquiring means includes a light source which irradiates an outer edge portion of each substrate including the notch from a plurality of angles in a circumferential direction of the substrates and an imaging unit which receives reflected light that is light outputted from the light source and reflected by the outer edge portion including the notch and which outputs brightness information of the reflected light as the shape information of the notch, and the notch position misalignment calculating means obtains the notch position of each substrate from the brightness information.

According to this configuration, the notch position misalignment calculating means is able to obtain a notch position misalignment by analyzing a notch position using brightness information of light reflected by the outer edge portion of a substrate including the notch. In addition, since the notch shape acquiring means is constituted by a light source and an imaging unit, the notch shape acquiring means can be realized in a relatively inexpensive manner.

Furthermore, in the configuration described above, favorably, the notch shape acquiring means is a laser microscope which acquires an image of notch shapes of all substrates from the front side of the openings of the notches and which outputs the acquired image as the shape information.

According to this configuration, since the notch position misalignment calculating means analyzes a notch position based on an image of notch shapes acquired by the laser microscope, a notch position can be accurately obtained. As a result, a notch position misalignment can be accurately calculated and a rotational misalignment can be accurately obtained.

In addition, in the configuration described above, favorably, the notch shape acquiring means is arranged across the notch at a position separated by a predetermined interval in the thickness direction of the substrate and acquires the shape information of the notch from one of or both surfaces of the bonded substrate.

According to this configuration, the notch position misalignment calculating means can analyze a positional relationship of another substrate with respect to the reference substrate using shape information of notches acquired from one of or both of the surfaces of the bonded substrate and measure a distance from the notch of the reference substrate to the notch of another substrate.

Furthermore, in the configuration described above, favorably, the notch shape acquiring means includes a first imaging unit which is arranged at a position separated from the notch by a predetermined interval in the thickness direction of the substrate and which photographs the notch from a side of the one surface of the bonded substrate and outputs first shape information, and a second imaging unit which is arranged at a position separated from the notch by a predetermined interval in the thickness direction of the substrate and which photographs the notch from a side of the other surface of the bonded substrate and outputs second shape information, and the notch position misalignment calculating means obtains the notch position of each substrate based on the first shape information and the second shape information.

According to this configuration, the notch shape acquiring means acquires shape information of a notch by photographing a notch shape of a substrate from both sides of the bonded substrate in the thickness direction (in other words, in a front and back direction of the bonded substrate). Therefore, arranging at least two imaging units such as cameras at positions separated from a notch by predetermined intervals may suffice and shape information of the notch can be readily acquired.

In addition, in the configuration described above, favorably, the notch shape acquiring means includes an infrared light source which is arranged at a position separated from the notch by a predetermined interval in the thickness direction of the substrate and which irradiates the notch from a side of the one surface of the bonded substrate, and an infrared camera which is arranged on a side of the other surface of the bonded substrate at a position separated from the notch by the predetermined interval in the thickness direction of the substrate, which receives transmitted light transmitted through the substrate among infrared light outputted by the infrared light source and which outputs intensity information of the transmitted light as the shape information of the notch, and the notch position misalignment calculating means obtains the notch position of each substrate based on the intensity information.

The substrates characteristically transmit infrared light. Using this characteristic, by configuring the notch shape acquiring means so as to include an infrared light source and an infrared camera, shape information of a notch can be readily acquired.

In addition, a rotational misalignment measuring method according to an aspect of the present invention is a rotational misalignment measuring method of a bonded substrate which detects a rotational misalignment between respective substrates of a bonded substrate in which a plurality of disk-like substrates each having a notch formed in an outer edge portion thereof is stacked on top of each other and bonded together in a thickness direction of the substrates, the method including the steps of: acquiring a center position misalignment that is a misalignment of a center position of each substrate; acquiring shape information of a notch of each substrate; obtaining a notch position of each substrate from the notch shape information and calculating, from the notch position, a notch position misalignment that is a misalignment of notch positions between the respective substrates; and calculating a rotational misalignment between the respective substrates based on the center position misalignment and the notch position misalignment.

According to this configuration, since a rotational misalignment of each substrate is calculated using a center position misalignment and a notch position misalignment of each substrate, a rotational misalignment between the respective substrates can be accurately calculated.

Furthermore, a method of manufacturing a bonded substrate according to an aspect of the present invention is a method of manufacturing a bonded substrate by bonding together a disk-like semiconductor substrate having a notch formed in an outer edge portion thereof and a disk-like supporting substrate having a notch formed in an outer edge portion thereof, the method including the steps of: bonding together the semiconductor substrate and the supporting substrate so that the notches overlap each other; measuring a rotational misalignment of the semiconductor substrate to which the supporting substrate has been bonded using the rotational misalignment measuring method described above; and inspecting the bonded substrate based on the rotational misalignment measured in the rotational misalignment measuring step.

According to this configuration, since a rotational misalignment of a bonded substrate is quantitatively obtained and the bonded substrate is inspected based on the obtained rotational misalignment, a measurement with respect to whether or not the bonded substrate is defective can be accurately performed.

This application is based on Japanese Patent applications No. 2011-264281 and No. 2012-180747 filed in Japan Patent Office on Dec. 2, 2011 and Aug. 17, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A rotational misalignment measuring device of a bonded substrate which detects a rotational misalignment between respective substrates of a bonded substrate in which a plurality of disk-like substrates each having a notch formed in an outer edge portion thereof is stacked on top of each other and bonded together in a thickness direction of the substrates, the rotational misalignment measuring device comprising:
　　center position misalignment acquiring means for acquiring a center position misalignment that is a misalignment of a center position of each substrate;
　　notch shape acquiring means for acquiring shape information of a notch of each substrate;
　　notch position misalignment calculating means for obtaining a notch position of each substrate from the notch shape information and calculating, from the notch position, a notch position misalignment that is a misalignment of notch positions between the respective substrates; and
　　rotational misalignment calculating means for calculating a rotational misalignment between the respective substrates based on the center position misalignment and the notch position misalignment, wherein
　　the notch shape acquiring means is arranged on a front side of an opening of the notch and simultaneously acquires shape information of the notches of all of the substrates,
　　the notch shape acquiring means includes:
　　　　a light source which irradiates an outer edge portion of each substrate including the notch from a plurality of angles in a circumferential direction of the substrates; and an imaging unit which receives reflected light that is light outputted from the light source and reflected by the outer edge portion including the notch and which outputs brightness information of the reflected light as the shape information of the notch, the notch position misalignment calculating means obtains the notch position of each substrate from the brightness information, wherein the light source includes at least one of a light emitting device mounted with a drive device to movably reposition the light emitting device at the plurality of angles relative to the circumferential direction of the substrates, and a plurality of light emitting devices mounted at the plurality of angles relative to the circumferential direction of the substrates, any one of the substrates is assumed to be a reference substrate, the center position misalignment acquiring means acquires, as the center position misalignment, a misalignment between a reference center position that is a center position of the reference substrate and a center position of a substrate other than the reference substrate, the notch position misalignment calculating means calculates, as the notch position misalignment, a misalignment between a reference notch position that is a notch position of the reference substrate and a notch position of the substrate other than the reference substrate, and the rotational misalignment calculating means uses a value obtained by subtracting the center position misalignment from the notch position misalignment and a value obtained by subtracting a depth of the notch in a radial direction of the substrate other than the reference substrate from a radius of the substrate other than the reference substrate to calculate, as the rotational misalignment, an angle between a straight line connecting the center position and the notch position of the reference substrate and a straight line connecting the center position and the notch position of the substrate other than the reference substrate.

2. A rotational misalignment measuring device of a bonded substrate which detects a rotational misalignment between respective substrates of a bonded substrate in which a plurality of disk-like substrates each having a notch formed in an outer edge portion thereof is stacked on top of each other and bonded together in a thickness direction of the substrates, the rotational misalignment measuring device comprising:

center position misalignment acquiring means for acquiring a center position misalignment that is a misalignment of a center position of each substrate;

notch shape acquiring means for acquiring shape information of a notch of each substrate;

notch position misalignment calculating means for obtaining a notch position of each substrate from the notch shape information and calculating, from the notch position, a notch position misalignment that is a misalignment of notch positions between the respective substrates; and rotational misalignment calculating means for calculating a rotational misalignment between the respective substrates based on the center position misalignment and the notch position misalignment, wherein the notch shape acquiring means is arranged across the notch at a position separated by a predetermined interval in the thickness direction of the substrate and acquires the shape information of the notch from one of or both surfaces of the bonded substrate, the notch shape acquiring means includes:

an infrared light source which is arranged at a position separated from the notch by a predetermined interval in the thickness direction of the substrate and which irradiates the notch from a side of the one surface of the bonded substrate; and an infrared camera which is arranged on a side of the other surface of the bonded substrate at a position separated from the notch by the predetermined interval in the thickness direction of the substrate, which receives transmitted light transmitted through the substrate among infrared light outputted by the infrared light source and which outputs intensity information of the transmitted light as the shape information of the notch, and the notch position misalignment calculating means obtains the notch position of each substrate based on the intensity information.

3. A rotational misalignment measuring device of a bonded substrate which detects a rotational misalignment between respective substrates of a bonded substrate in which a plurality of disk-like substrates each having a notch formed in an outer edge portion thereof is stacked on top of each other and bonded together in a thickness direction of the substrates, the rotational misalignment measuring device comprising:

center position misalignment acquiring means for acquiring a center position misalignment that is a misalignment of a center position of each substrate;

notch shape acquiring means for acquiring shape information of a notch of each substrate;

notch position misalignment calculating means for obtaining a notch position of each substrate from the notch shape information and calculating, from the notch position, a notch position misalignment that is a misalignment of notch positions between the respective substrates; and rotational misalignment calculating means for calculating a rotational misalignment between the respective substrates based on the center position misalignment and the notch position misalignment wherein the notch shape acquiring means is arranged on a front side of an opening of the notch and simultaneously acquires shape information of the notches of all of the substrates, the notch shape acquiring means is a laser microscope which acquires an image of notch shapes of all substrates from the front side of the openings of the notches and which outputs the acquired image as the shape information, any one of the substrates is assumed to be a reference substrate, the center position misalignment acquiring means acquires, as the center position misalignment, a misalignment between a reference center position that is a center position of the reference substrate and a center position of a substrate other than the reference substrate, the notch position misalignment calculating means calculates, as the notch position misalignment, a misalignment between a reference notch position that is a notch position of the reference substrate and a notch position of the substrate other than the reference substrate, and the rotational misalignment calculating means uses a value obtained by subtracting the center position misalignment from the notch position misalignment and a value obtained by subtracting a depth of the notch in a radial direction of the substrate other than the reference substrate from a radius of the substrate other than the reference substrate to calculate, as the rotational misalignment, an angle between a straight line connecting the center position and the notch position of the reference substrate and a straight line connecting the center position and the notch position of the substrate other than the reference substrate.

4. A rotational misalignment measuring device of a bonded substrate which detects a rotational misalignment between respective substrates of a bonded substrate in which a plurality of disk-like substrates each having a notch formed in an outer edge portion thereof is stacked on top of each other and bonded together in a thickness direction of the substrates, the rotational misalignment measuring device comprising:
  center position misalignment acquiring means for acquiring a center position misalignment that is a misalignment of a center position of each substrate;
  notch shape acquiring means for acquiring shape information of a notch of each substrate;
  notch position misalignment calculating means for obtaining a notch position of each substrate from the notch shape information and calculating, from the notch position, a notch position misalignment that is a misalignment of notch positions between the respective substrates; and
  rotational misalignment calculating means for calculating a rotational misalignment between the respective substrates based on the center position misalignment and the notch position misalignment, wherein
  the notch shape acquiring means is arranged across the notch at a position separated by a predetermined interval in the thickness direction of the substrate and acquires the shape information of the notch from one of or both surfaces of the bonded substrate,
  the notch shape acquiring means includes:
    a first imaging unit which is arranged at a position separated from the notch by a predetermined interval in the thickness direction of the substrate and which photographs the notch from a side of the one surface of the bonded substrate and outputs first shape information, the first imaging unit being focused at a first outer edge portion of the notch; and
    a second imaging unit which is arranged at a position separated from the notch by a predetermined interval in the thickness direction of the substrate and which photographs the notch from a side of the other surface of the bonded substrate and outputs second shape information, the second imaging unit being focused at a second outer edge portion of the notch,
  the notch position misalignment calculating means obtains the notch position of each substrate based on the first shape information and the second shape information,
  any one of the substrates is assumed to be a reference substrate,
  the center position misalignment acquiring means acquires, as the center position misalignment, a misalignment between a reference center position that is a center position of the reference substrate and a center position of a substrate other than the reference substrate,
  the notch position misalignment calculating means calculates, as the notch position misalignment, a misalignment between a reference notch position that is a notch position of the reference substrate and a notch position of the substrate other than the reference substrate, and
  the rotational misalignment calculating means uses a value which subtracted the center position misalignment from the notch position misalignment and a value obtained by subtracting a depth of the notch in a radial direction of the substrate other than the reference substrate from a radius of the substrate other than the reference substrate to calculate, as the rotational misalignment, an angle between a straight line connecting the center position and the notch position of the reference substrate and a straight line connecting the center position and the notch position of the substrate other than the reference substrate.

5. The rotational misalignment measuring device of a bonded substrate according to claim 2, wherein any one of the plurality of substrates is assumed to be a reference substrate,
  the center position misalignment acquiring means acquires, as the center position misalignment, a misalignment between a reference center position that is a center position of the reference substrate and a center position of a substrate other than the reference substrate,
  the notch position misalignment calculating means calculates, as the notch position misalignment, a misalignment between a reference notch position that is a notch position of the reference substrate and a notch position of the substrate other than the reference substrate, and
  the rotational misalignment calculating means uses the center position misalignment and the notch position misalignment to calculate, as the rotational misalignment, an angle between a straight line connecting the center position and the notch position of the reference substrate and a straight line connecting the center position and the notch position of the substrate other than the reference substrate.

6. A rotational misalignment measuring device of a bonded substrate which detects a rotational misalignment between respective substrates of a bonded substrate in which a plurality of disk-like substrates each having a notch formed in an outer edge portion thereof is stacked on top of each other and bonded together in a thickness direction of the substrates, the rotational misalignment measuring device comprising:
  center position misalignment acquiring means for acquiring a center position misalignment that is a misalignment of a center position of each substrate;
  notch shape acquiring means for acquiring shape information of a notch of each substrate;
  notch position misalignment calculating means for obtaining a notch position of each substrate from the notch shape information and calculating, from the notch position, a notch position misalignment that is a misalignment of notch positions between the respective substrates; and
  rotational misalignment calculating means for calculating a rotational misalignment between the respective substrates based on the center position misalignment and the notch position misalignment, wherein
  any one of the plurality of substrates is assumed to be a reference substrate,
  the center position misalignment acquiring means acquires, as the center position misalignment, a misalignment between a reference center position that is a center position of the reference substrate and a center position of a substrate other than the reference substrate,
  the notch position misalignment calculating means calculates, as the notch position misalignment, a misalignment between a reference notch position that is a notch position of the reference substrate and a notch position of the substrate other than the reference substrate, and
  the rotational misalignment calculating means uses a value obtained by subtracting the center position misalignment from the notch position misalignment and a value obtained by subtracting a depth of the notch in a radial direction of the substrate other than the reference substrate from a radius of the substrate other than the reference substrate to calculate, as the rotational misalignment, an angle between a straight line connecting the center position and the notch position of the reference substrate and a straight line connecting the center position and the notch position of the substrate other than the reference substrate.

* * * * *